US012809506B2

(12) United States Patent
Abel et al.

(10) Patent No.: US 12,809,506 B2
(45) Date of Patent: Nov. 24, 2026

(54) SYSTEMS AND METHODS FOR CUSTOMIZING IMAGES BASED ON USER PREFERENCES

(71) Applicant: Sony Interactive Entertainment Inc., Tokyo (JP)

(72) Inventors: Rebecca Abel, Longmont, CO (US); Michael Taylor, San Bruno, CA (US); Ellana Fortuna, Austin, TX (US); Warren M. Benedetto, Foothill Ranch, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 222 days.

(21) Appl. No.: 18/081,638

(22) Filed: Dec. 14, 2022

(65) Prior Publication Data

US 2024/0201833 A1 Jun. 20, 2024

(51) Int. Cl.

| | |
|---|---|
| ***G06F 3/04845*** | (2022.01) |
| ***G06F 18/22*** | (2023.01) |
| ***G06T 3/40*** | (2006.01) |

(52) U.S. Cl.

CPC .......... *G06F 3/04845* (2013.01); *G06F 18/22* (2023.01); *G06T 3/40* (2013.01)

(58) Field of Classification Search

None

See application file for complete search history.

(56) References Cited

U.S. PATENT DOCUMENTS

| | | | | |
|---|---|---|---|---|
| 2019/0205946 | A1* | 7/2019 | Mellina | G06N 20/00 |
| 2020/0065940 | A1* | 2/2020 | Tang | G06T 3/40 |
| 2021/0209766 | A1* | 7/2021 | Cho | G06T 7/11 |
| 2022/0408070 | A1* | 12/2022 | Hirt | G06T 3/4038 |
| 2023/0230198 | A1* | 7/2023 | Zhang | G06N 3/047<br>382/276 |
| 2023/0368509 | A1* | 11/2023 | Xu | G06V 10/761 |

(Continued)

OTHER PUBLICATIONS

PCT/US2023/081848 Notification of Transmittal of the International Search Report and the Written Opinion of the International Searching Authority, or the Declaration, PCT/ISA/220, and the International Search Report, PCT/ISA/210, Mar. 12, 2024.

(Continued)

*Primary Examiner* — Yi Wang

(74) *Attorney, Agent, or Firm* — Kilpatrick Townsend & Stockton LLP

(57) ABSTRACT

Systems and methods for customizing an image based on user preferences are described. One of the methods includes receiving a textual description with a request to generate an image, accessing a user account to identify a characteristic of a user and a profile of the user, and generating the image by applying an image generation artificial intelligence (IGAI) model to the textual description based on the characteristic of the user and the profile of the user. The IGAI model is trained based on a plurality of images and a plurality of textual descriptions received from a plurality of users. The method further includes conditioning the image to confirm that the image satisfies a plurality of constraints to output a conditioned image and providing the conditioned image for display on a client device via the user account.

17 Claims, 10 Drawing Sheets

(56) References Cited

U.S. PATENT DOCUMENTS

| | | | | |
|---|---|---|---|---|
| 2023/0419571 | A1* | 12/2023 | Zhang | G06T 11/60 |
| 2024/0087179 | A1* | 3/2024 | Min | G06T 11/00 |

OTHER PUBLICATIONS

Aditya et a.: "DALL.E: Creating Images from text", Jan. 5, 2021 (Jan. 5, 2021, pp. 1-18, XP093134452, URL: https://openai.com/research/dall-e [retrieved Feb. 23, 2024, pp. 1, 2, 4, 7.

* cited by examiner

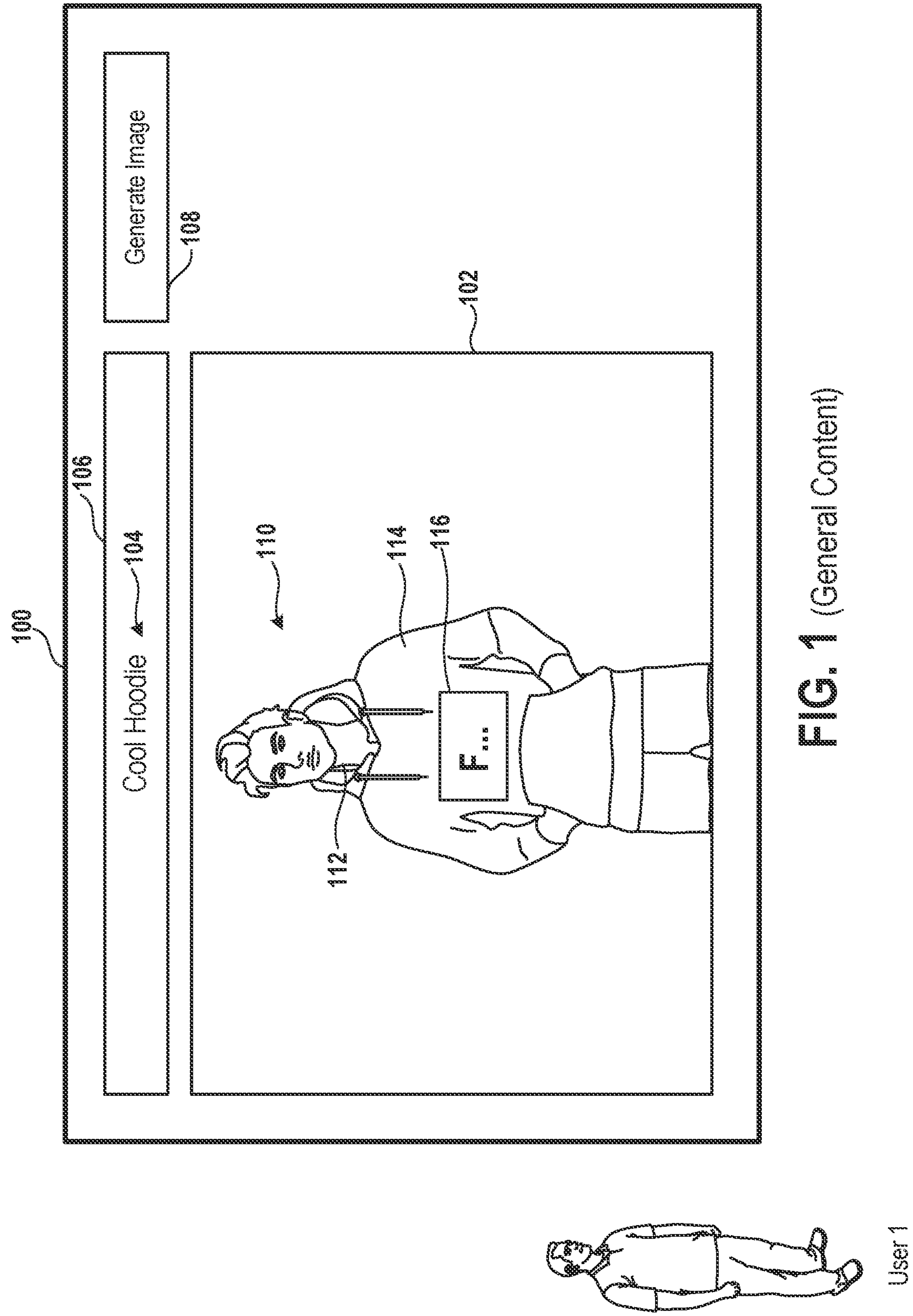
FIG. 1 (General Content)

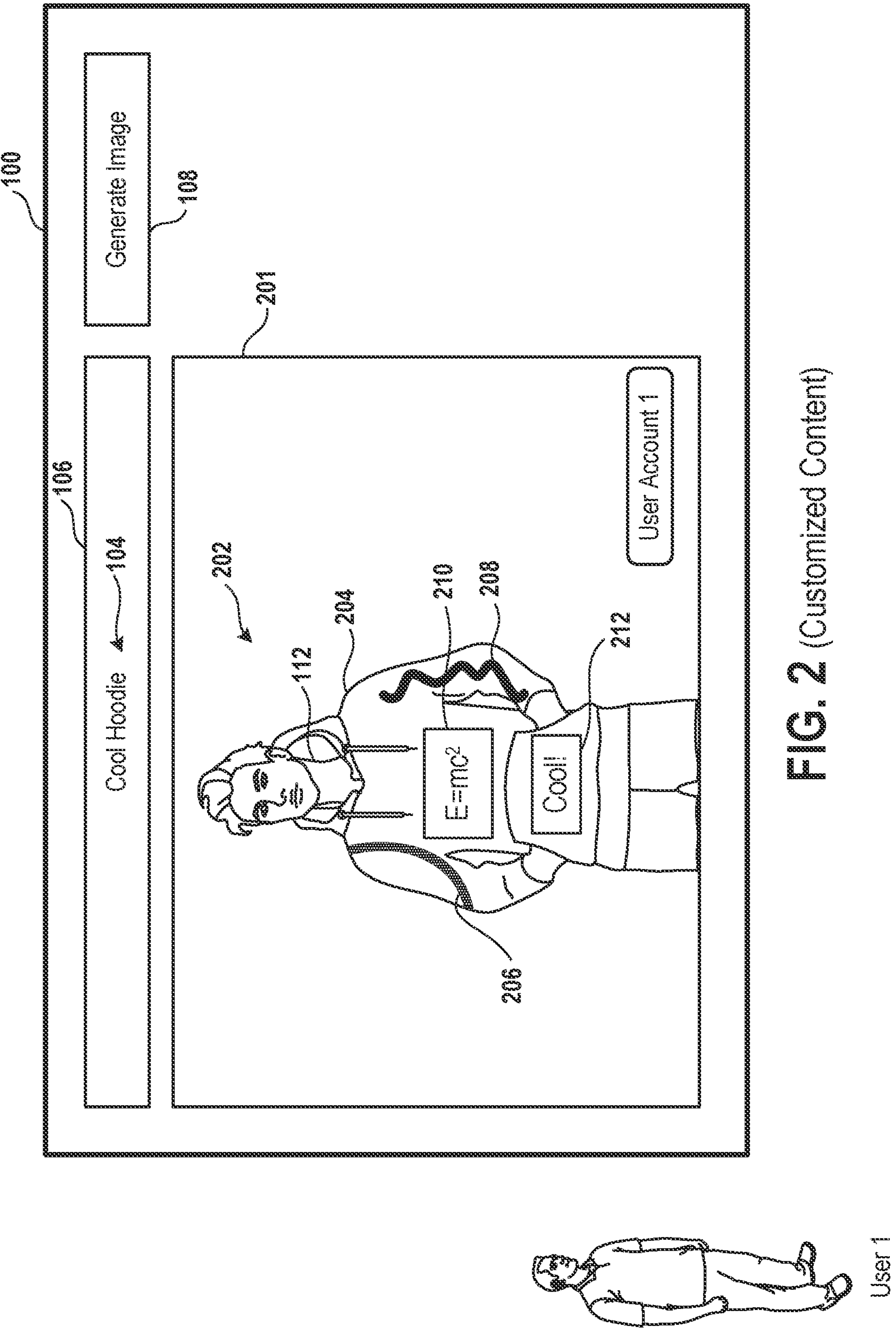
FIG. 2 (Customized Content)

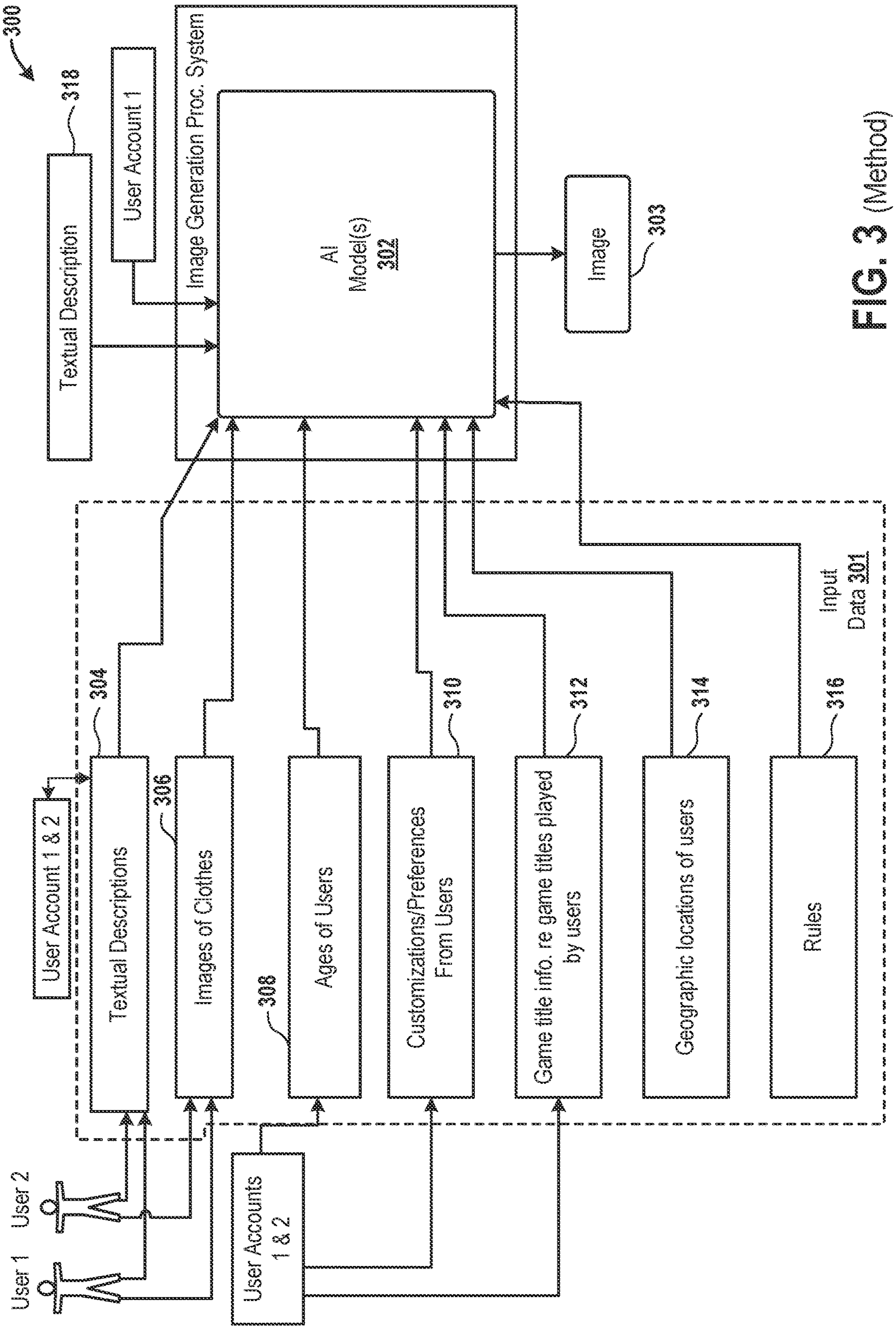
FIG. 3 (Method)

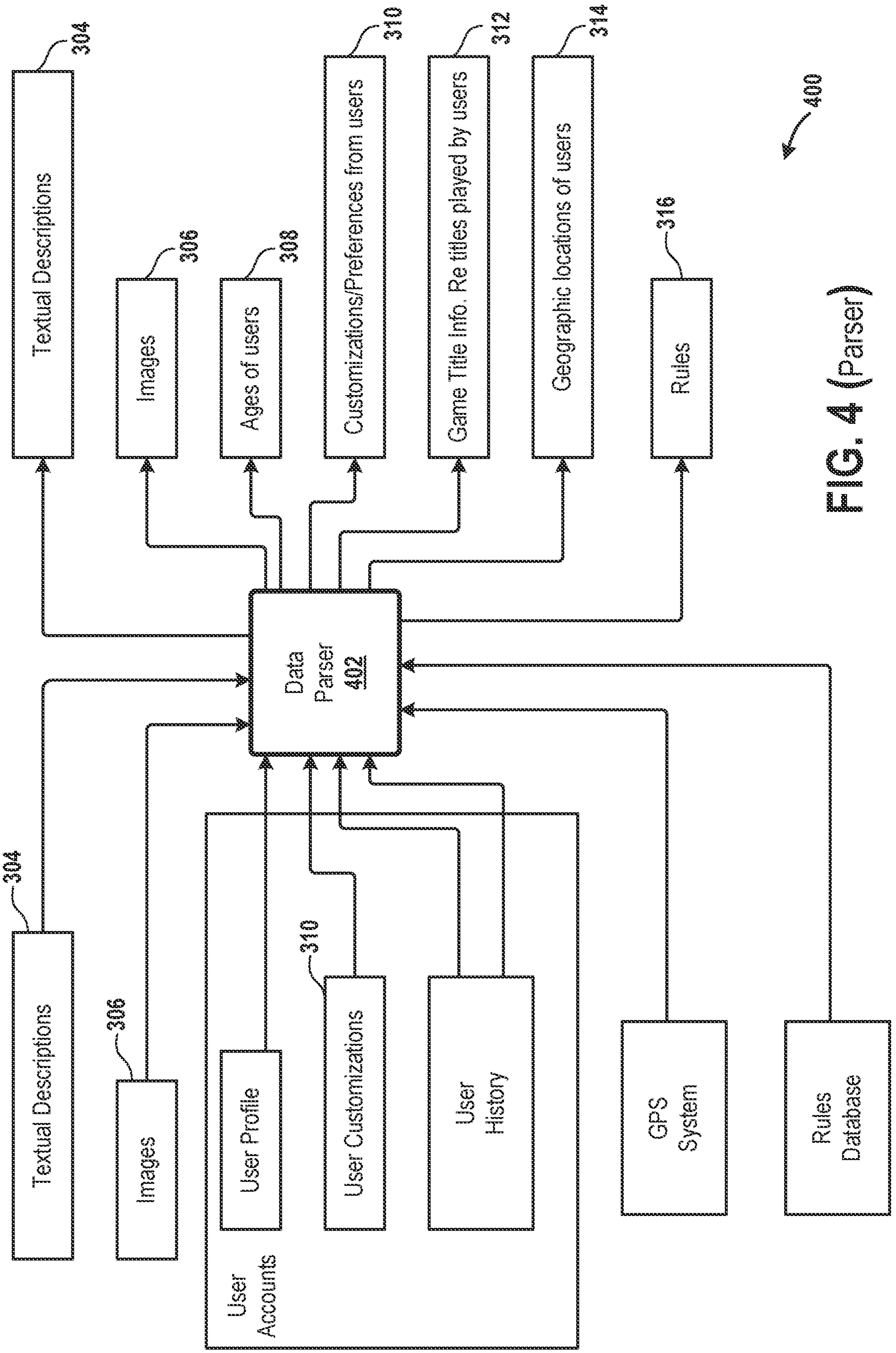
FIG. 4 (Parser)

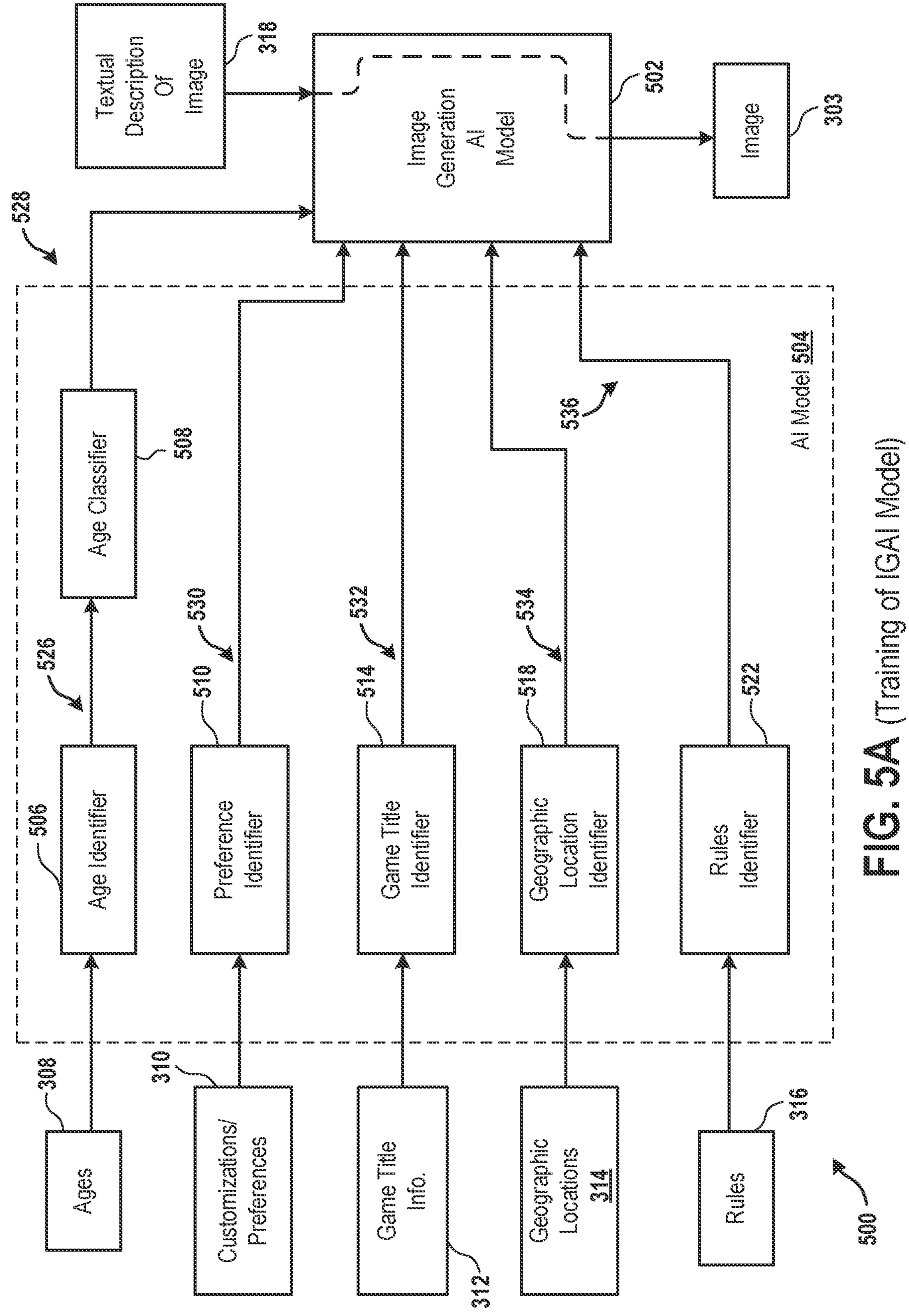
FIG. 5A (Training of IGAI Model)

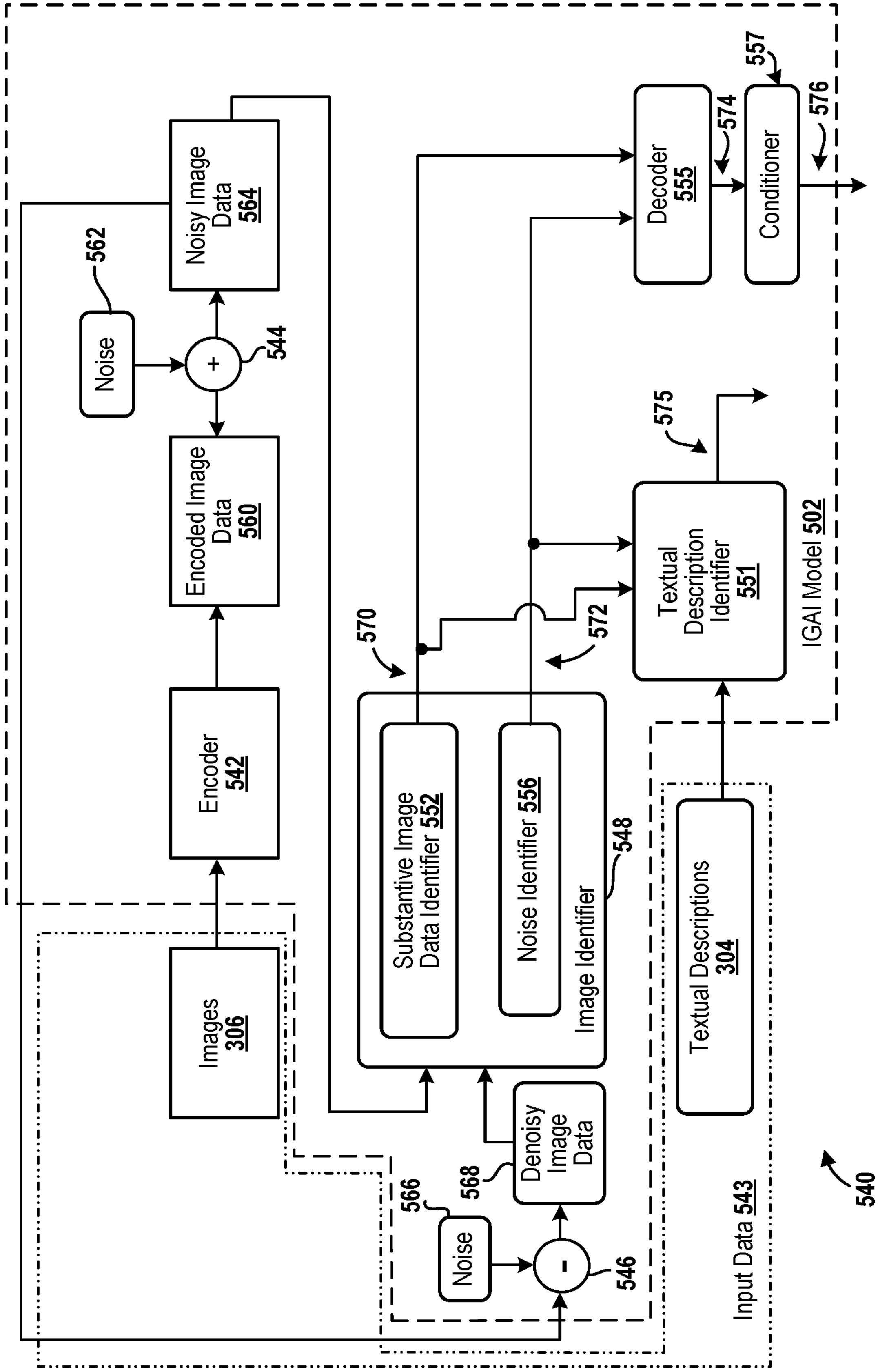
FIG. 5B (Training of IGAI Model)

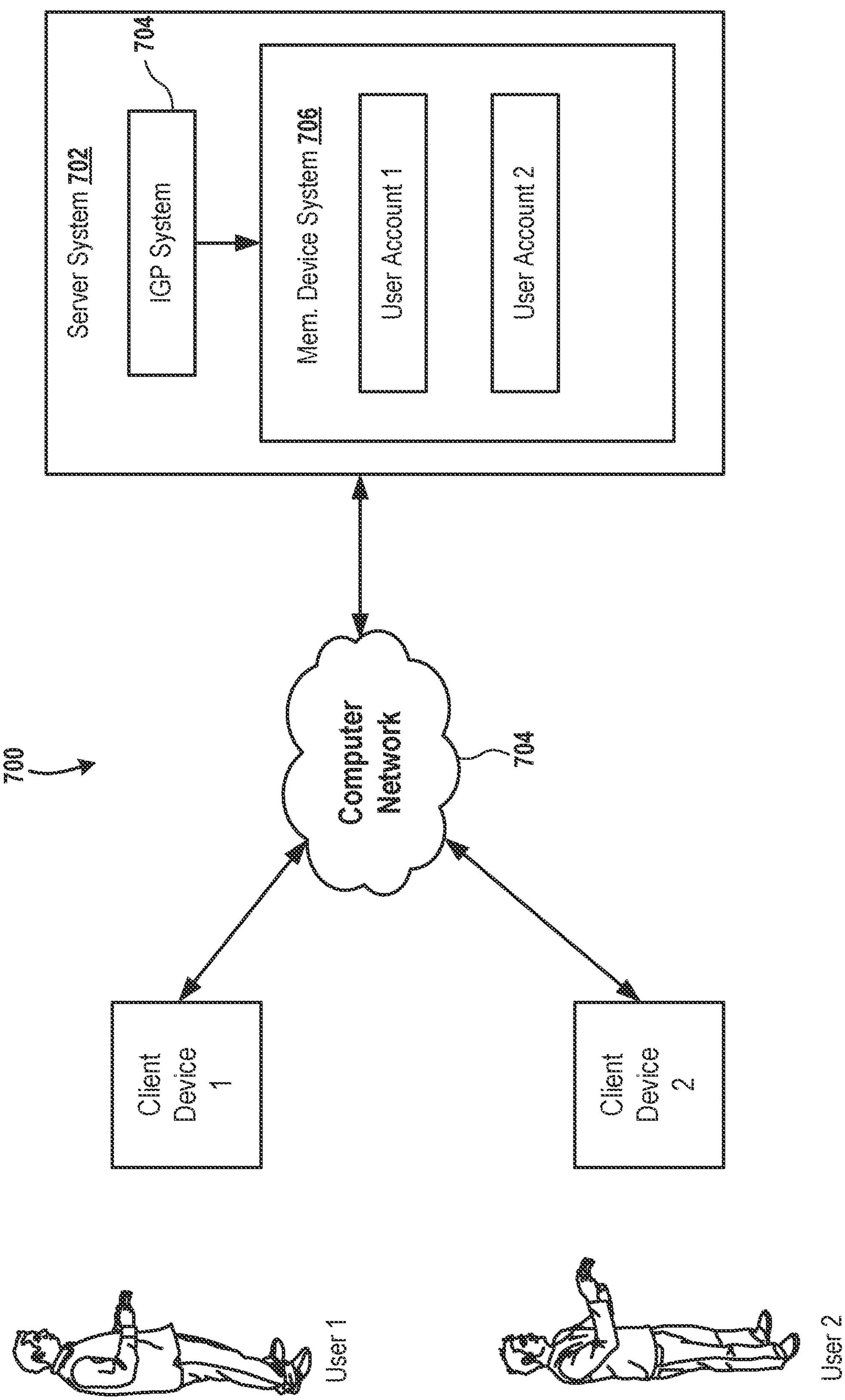
FIG. 7 (System)

SYSTEMS AND METHODS FOR CUSTOMIZING IMAGES BASED ON USER PREFERENCES

FIELD

The present disclosure relates to systems and methods for customizing images based on user preferences are described.

BACKGROUND

A process of storing, finding, retrieving, or generating one or more images stored electronically has become increasingly difficult for a variety of reasons. For instance, when a user searches for images on the Internet, an image generating algorithm produces sets of images in a random manner. With the production of the images in the random manner, an ability of computer programs to perform searching, generating, and retrieval functions in an efficient, useful, and timely manner is challenging.

It is in this context that embodiments of the invention arise.

SUMMARY

Embodiments of the present disclosure provide systems and methods for customizing images based on user preferences.

In an embodiment, when an image is generated automatically by an image generation artificial intelligence (AI) image generation model, responsive to user input, the image can contain inappropriate content. The inappropriate content is subjective, as it is directed to a specific audience. For example, if the image generated is for use in a video game that is directed toward children, the inappropriate content is to be modified. As an example, the modification occurs by providing feedback to the AI model regarding what aspects of the image are inappropriate. In some embodiments, a description or commentary or natural language feedback can be provided by the user or a moderator. As an example, the description or commentary can be as simple as "I don't like this", "I don't want explosions", "not appropriate for children", "not good for children", "needs to be more masculine", "needs to be more feminine", "needs more mountains", "needs more rivers", or "needs higher skyscrapers". As another example, the feedback includes supplying another image to the AI model, where the other image is utilized by the AI model to modify the initially generated image. Providing the commentary regarding an output, such as the initially generated image, is referred to herein as moderating the output.

In some embodiments, the AI model itself can be modified to identify multidimensional vectors that cause the inappropriate content to be generated. This is done by analyzing the AI model to identify latent spaces, which trigger or potentially trigger generation of the inappropriate content.

In one configuration, the AI model, such as a neural network, is modified in advance to avoid having the AI model generate the inappropriate content. This is referred to as moderating the input.

In an embodiment, the output generated by the AI model is automatically input to a second examination model that is designed to identify features in the image which may be inappropriate or undesirable, and make new input that is provided back to the AI model as feedback so that the AI model can generate a new image that is more appropriate or desirable. The second examination model is an additional AI model.

In an embodiment, a method for customizing an image based on user preferences is described. The method includes receiving a textual description with a request to generate an image, accessing a user account to identify a characteristic of a user and a profile of the user, and generating the image by applying an image generation AI (IGAI) model to the textual description based on the characteristic of the user and the profile of the user. The IGAI model is trained based on a plurality of images and a plurality of textual descriptions received from a plurality of users. The method further includes conditioning the image to confirm that the image satisfies a plurality of constraints to output a conditioned image and providing the conditioned image for display on a client device via the user account.

In one embodiment, a server system for customizing an image based on user preferences is described. The server system includes a processor and a memory device coupled to the processor. The processor receives a textual description with a request to generate an image, accesses a user account to identify a characteristic of a user and a profile of the user, and generates the image by applying an IGAI model to the textual description based on the characteristic of the user and the profile of the user. The IGAI model is trained based on a plurality of images and a plurality of textual descriptions received from a plurality of users. The processor conditions the image to confirm that the image satisfies a plurality of constraints to output a conditioned image. The processor provides the conditioned image for display on a client device via the user account.

In an embodiment, a non-transitory computer-readable medium containing program instructions for customizing an image based on user preferences is described. Execution of the program instructions by one or more processors of a computer system causes the one or more processors to carry out operations. The operations include receiving a textual description with a request to generate an image, accessing a user account to identify a characteristic of a user and a profile of the user, and generating the image by applying an IGAI model to the textual description based on the characteristic of the user and the profile of the user. The IGAI model is trained based on a plurality of images and a plurality of textual descriptions received from a plurality of users. The operations further include conditioning the image to confirm that the image satisfies a plurality of constraints to output a conditioned image and providing the conditioned image for display on a client device via the user account.

Some advantages of the herein described systems and methods include customizing images based on user preferences. For example, instead of generating inappropriate images to display to a child user, the systems and methods described herein generate content, such as an image, that is appropriate to the child user to be displayed to the child user via a user account assigned to the child user. The customization occurs based on images previously displayed via the user account to the child user or comments regarding the images received from the child user via the user account or additional images previously displayed via additional user accounts to other children or comments regarding the additional images received from the other children received via the additional user accounts or a combination thereof. As another example, the customization occurs based on images previously displayed via a user account to a family manager or comments regarding the images received from the family manager via the user account or additional images previously displayed via additional user accounts to other family managers or comments regarding the additional images received from the other family managers received via the additional user accounts or a combination thereof. An example of the family manager is a parent or a guardian or an adult sibling of the child user. A family manager is an example of a user.

In addition, the systems and methods described herein account for other preferences of the child user or the children or a combination thereof. For example, when the children or the child user or a combination thereof access, via their user accounts, a video game, an appropriate image generated based on a text description provided by the child user includes a symbolic virtual item from the video game. The appropriate image is generated based on regulations, such as locale regulations, and account preferences of the family manager. This provides customization of the appropriate image for the child user.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 1 is a diagram of an embodiment of a display device on which an image is displayed to illustrate a display of general content.

FIG. 2 is a diagram of an embodiment of the display device to illustrate a display of customized content on a display screen of the display device after applying the systems and methods for customizing images based on user preferences.

FIG. 3 is a diagram of an embodiment of a system to illustrate an application of one or more artificial intelligence (AI) models to generate the customized content.

FIG. 4 is a diagram of an embodiment of a system to illustrate a data parser.

FIG. 5A is a diagram of an embodiment of a system to illustrate an image generation AI (IGAI) model.

FIG. 5B is a diagram of an embodiment of a system to illustrate training of the IGAI model based on textual descriptions and images.

FIG. 7 is a diagram of an embodiment of a system to illustrate use of client devices with a server system.

DETAILED DESCRIPTION

Figure 6A:
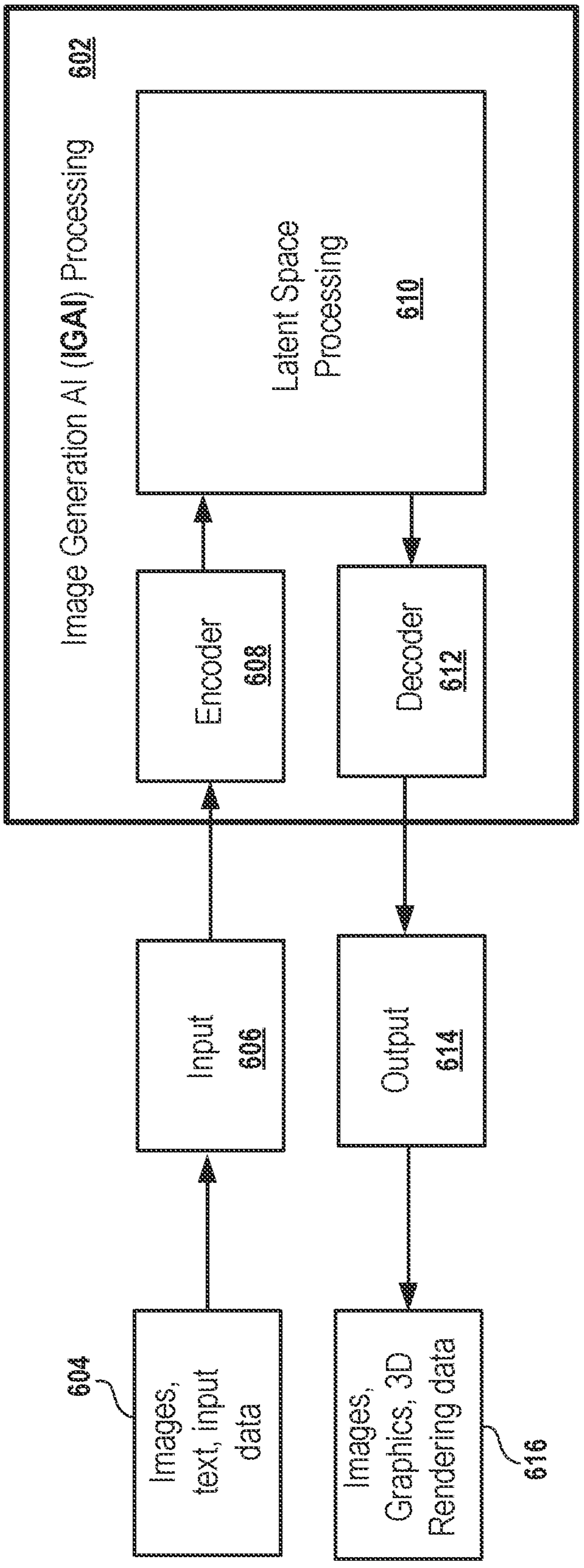
FIG. 6A is an embodiment of a general representation of a processing sequence of an IGAI model.

Systems and methods for customizing images based on user preferences are described. It should be noted that various embodiments of the present disclosure are practiced without some or all of these specific details. In other instances, well known process operations have not been described in detail in order not to unnecessarily obscure various embodiments of the present disclosure.

FIG. 1 is a diagram of an embodiment of a display device 100 on which an image 102 is displayed to illustrate a display of general content 110. Examples of a display device, as used herein, include a plasma display, a light emitting diode (LED) display, and a liquid crystal display (LCD). To illustrate, the display device includes a display screen of a desktop computer, or a display screen of a laptop computer, or a display screen of a head-mounted display (HMD), or a display screen of a smart television, or display screen of a television, or a display screen of a smart phone, or a display screen of a tablet.

A user 1 uses one or more input devices to access a website or a web-based application and provides a textual description 104, such as "Cool Hoodie", within a text field 106 displayed on the website or the web-based application. An example of a textual description is a natural language description or a commentary or a paragraph or a sentence or a statement or an assertion or a question or a combination of two or more thereof. Examples of an input device include a hand-held controller, a remote control, a keyboard, a keypad, a mouse, and a stylus. Moreover, after providing the textual description 104, the user 1 uses the input device to select a generate image button 108 that is displayed on the display screen 100. When the generate image button 108 is selected, a request, such as an indication or a signal, to generate an image, such as the image 102, is generated by a client device, which is described below.

The request to generate an image and the textual description 104 are sent by the client device via a computer network, such as the Internet or an Intranet or a combination thereof, to a server system, described later with reference to FIG. 7. Upon receiving the request to generate an image via the computer network, the server system that hosts the website or that executes the web-based application generates image data for displaying the image 102 on the display device 102. The image data is generated based on the textual description 102 by the server system.

The image 102 includes the general content 110, such as a virtual user 112 wearing a virtual hoodie 114. The virtual hoodie 114 includes inappropriate content 116. As an example, the virtual hoodie 114 includes proprietary content or sexually suggestive content or the inappropriate content 116 or a combination thereof. As an example, the user 1 does not access a user account 1 assigned to the user 1 before providing the textual description 104 and selecting the generate image button 108. In the example, the inappropriate content 116 is not accessed via the user account 1 and is not customized to the user 1. As another example, the user 1 accesses the user account 1 before providing the textual description 104 and selecting the generate image button 108. In the example, the inappropriate content 116 is generated and accessed via the user account 1 when one or more artificial intelligence (AI) models of the server system for customizing the inappropriate content 116 are not yet trained.

FIG. 2 is a diagram of an embodiment of the display device 100 to illustrate a display of an image 201, having customized content 202, on the display screen of the display device 100 after applying the systems and methods for customizing images based on user preferences. The user 1 logs into the user account 1 that is assigned by the server system to access the user account 1. For example, one or more processors of the server system determine whether user information, such as a username and password, received from the client device via the computer network is authentic. Upon determining so, the server system provides access to the user account 1. On the other hand, upon determining that the user information is not authentic, the server system does not allow access to the user account 1. Examples of the client device include a combination of the input device, a game console, and the display device, a combination of the display device and the game console, and a combination of the input device and a computer. Further examples of the client device include a smartphone, a computer, a tablet, and a smart television.

After accessing the user account 1, the user 1 provides the textual description 104 to the text field 106 via the user account 1 and selects the generate image button 108 via the user account 1. The request to generate the image is generated by the client device when the generate image button 108 is selected by the user 1 via the input device. The request to generate an image is sent with the textual description 104 from the client device via the computer network to the server system. After allowing the user 1 access to the user account 1 and receiving the request to generate an image, such as the image 201 having the customized content 202, with the textual description 104 via the computer network, the one or more AI models of the server system are applied to the textual description 104 to generate image data for displaying the image 201 having the customized content 202 on the display screen of the display device 100. The customized content 202 includes the virtual user 112 wearing a virtual hoodie 204. The virtual hoodie 204 includes a virtual belt 206, a virtual dragon 208, a virtual symbol 210, and a virtual word 212. An example of the virtual symbol 210 is "$E=mc^2$" and an example of the virtual word 212 is "Cool!".

An example of an AI model, as used herein, include a machine learning computer program that emulates logical decision-making based on available data. To illustrate, the AI model is a neural network, such as an artificial neural network with multiple layers between the input and output layers. The multiple layers are coupled between the input layers and the output layers.

It should be noted that after applying the systems and methods for customizing images based on user preferences, the inappropriate content 116 (FIG. 1) is replaced with the virtual symbol 210. Also, the image 201 having the customized content 202, including the virtual belt 206, the virtual dragon 208, and the virtual word 212, is displayed instead of the image 102 having the general content 110 (FIG. 1).

FIG. 3 is a diagram of an embodiment of a system 300 to illustrate an application of one or more AI models 302 to generate the image 202 having the customized content 202 (FIG. 2). An example of the image 303 includes an image for advertising to users, such as the user 1 or a user 2. To illustrate, the image 303 is generated by the server system to advertise the cool hoodie to the user 1. Another example of image 303 includes an image to be used by the user 1 as a computer background image.

The system 300 includes the AI models 302 and input data 301. The input data 301 includes textual descriptions 304, images 306, ages 308 of the users, customizations 310 or preferences received from the users via respective user accounts, game title information 312 regarding game titles played by the users, geographic locations 314 of the users, and rules 316. For example, the textual descriptions 304 include text that is received within the text field 106 (FIG. 1) via the user account 1, text that is received within the text field 106 independent of whether the user 1 is logged into the user account 1, and text that is received from other users, such as the user 2, for generating an image. To illustrate, the textual descriptions 304 include text that is received within a text field via a user account 2 assigned to the user 2 and text that is received within the text field independent of whether the user 2 is logged into the user account 2.

Moreover, in the example, the images 306 include one or more images that are received from the user 1 via the user account 1, or received from the user 1 independent of whether the user 1 is logged into the user account 1, or received from the other users, or accessed via the computer network by the server system, or generated by the server system after applying the one or more AI models 302, or displayed on the client devices operated by the users, or a combination of two or more thereof. To illustrate, the images 306 includes one or more images that are received from the user 2 via the user account 2 and received from the user 2 independent of whether the user 2 is logged into the user account 2. To further illustrate, a user, such as the user 1 or the user 2, uses the input device to upload the images 306 to the server system via the computer network. In the further illustration, the user uploads a first image within a predetermined time window from a time at which a first textual description of the first image is sent to the server system via the computer network, uploads a second image within the predetermined time window from a time at which a second textual description of the second image is sent to the server system via the computer network, uploads a third image within the predetermined time window from a time at which a third textual description of the third image is sent to the server system via the computer network, and uploads a fourth image within the predetermined time window from a time at which a fourth textual description of the fourth image is sent to the server system via the computer network. Also, in the further illustration, the first textual description is "cool shirt", the second textual description is "ugly pants", the third textual description is "awesome jacket", and the fourth textual description is "hoodie". In the further illustration, the first image depicts the cool shirt, the second image depicts the ugly pants, the third image depicts the awesome jacket, and the fourth image depicts the hoodie. In the further illustration, each of the first through fourth images are uploaded when an indication of a selection of an upload button that is displayed besides the generate image button 108 (FIG. 1) is received from the input device. As another illustration, the first through fourth images are searched and accessed from the Internet by the server system based on the first through fourth textual descriptions instead of being received from a user, such as the user 1 or 2. As yet another illustration, the first through fourth images are generated by the server system by applying the one or more AI models 302 based on the first through fourth textual descriptions.

Further in the example, the ages 308 include ages of the users, such as an age of 12 years of the user 1 and an age of 23 years of the user 1. The ages 308 are a part of a profile of a user, such as the user 1 or 2, and the profile is stored within a user account, such as the user account 1 or 2, assigned to the user. Also in the example, the customizations 310 include a comment indicating to place a term "Cool!" on a hoodie or an image of the term "Cool!" that the user prefers to be placed on an image of a hoodie or a combination thereof. To illustrate, the comment or the image or the combination thereof is received via the user account assigned to the user. To further illustrate, the comment or the image or the combination thereof is received during a chat session between the user 1 and the other users, such as the user 2. In the further illustration, the user 1 comments that it is awesome to have the term "Cool!" on an image of the hoodie. As an additional illustration, the comment or the image or the combination thereof is received after the image 102 having the general content 110 (FIG. 1) is displayed. In the additional illustration, the user 1 logs into the user account 1 immediately after the image 102 is displayed and provides the comment or the image or the combination thereof via the user account 1 to the client device via the input device, and the comment or the image or the combination thereof is sent from the client device via the computer network to the server system. In the additional illustration, the comment or the image or the combination thereof is for providing feedback regarding the general content 110 from the client device operated by the user 1 via the computer network to the server system. As another further illustration, the comment or the image or the combination thereof is received within a multimedia field that is provided besides the generate image button 108. In the other further illustration, the comment or the image or the combination thereof is received within a preset time window from providing the textual description 104 (FIG. 2) and/or within a predetermined time window from a time of display of the general content 110. In the other further illustration, the comment of the image or the combination thereof is provided by a user, such as the user 1 or 2, after the user logs into his/her user account assigned to the user. In the other further illustration, the comment of the image or the combination thereof is received with an indication of a selection of a multimedia button that is displayed besides the multimedia field. In the other further illustration, the multimedia button is selected by the user via the input device. As yet another further illustration, the comment is received within a multimedia field that is provided besides the generate image button 108 after the image 102 (FIG. 1) is displayed. In the other further illustration, the user 1 logs into the user account 1 after the general content 110 is displayed. In the other further illustration, after logging into the user account 1, the server system receives the comment from the user 1 indicating that the user 1 does not like the general content 110. Also, in the other further illustration, the comment or the image or the combination thereof is received within a preset time window from displaying the general content 110 (FIG. 2). Other illustrations of the comment of the customizations 310 include "I do not like blood", "I do not like skull", "I do not like inappropriate terms", "I do not like sexually suggestive terms", "I don't like this", "I don't want explosions", "not appropriate for children", "not good for children", "needs to be more masculine", "needs to be more feminine", "needs more mountains", "needs more rivers", and "needs higher skyscrapers".

In the example, the game title information 312 includes titles, such as a first title and a second title, of video games that are played by the user, such as the user 1 or user 2, via the user account, such as the user account 1 or 2, assigned to the user, and time information associated with the play of the game titles. To illustrate, the game information 312, such as game titles, is a part of metadata that is stored by the server system to identify video games that are played by the user 1. In the illustration, the time information includes an amount of time for which each of the game titles is played by the user 1 and a frequency of game play of each of the game titles. In the illustration, the user 1 logs into the user account 1 to access the video games from the server system.

Further, in the example, the geographic locations 314 includes geographic locations of the user, such as the user 1 or 2, that are tracked by a global positioning system (GPS) receiver of the client device operated by the user. To illustrate, the GPS tracks that the user 1 is in China or in India or another country. In the illustration, the GPS tracks the geographic location of the user 1 within a predetermined time window from a time at which the server system receives the textual description 104 from the client device operated by the user 1. To further illustrate, the GPS tracks the geographic location of the user 1 within the predetermined time window before or after a time period. In the further illustration, during the time period, the textual description 104 is received by the text field 106 and sent from the client device operated by the user 1 with the request to generate the image 303 to the server system. In the further illustration, the server system informs the GPS that the textual description 104 with the request to generate the image 303 is received and in response to being informed, the GPS provides the geographic location of the user 1 to the AI models 302 of the server system within the predetermined time window.

Also in the example, the rules 316 include copyright rules or trademark rules or a combination thereof that restrict, such as forbid or do not allow, placement of terms or images on the image 201 (FIG. 2). To illustrate, the trademark rules include that a term, "Spider-Man™" or an image of Spider-Man™ cannot be placed on an image of the cool hoodie without obtaining a license from an entity, Marvel Characters, Inc.™. The rules 316 are stored in a rules database within the server system. The customizations 310, the geographic locations 314, and the game title information 312 are examples of characteristics of one or more of the users, such as the user 1 and the user 2.

The AI models 302 are executed by the server system to be trained based on the textual descriptions 304, or the images 306, or the ages 308, or the customizations 310, or the game title information 312, or the geographic locations 314, or the rules 316, or a combination of two or more thereof to output the image 303. After the AI models 302 are trained or during the training, the AI models 302 receives a textual description 318, such as the textual description 104 (FIG. 1), via the user account 1 from the user 1. For example, the user 1 logs into the user account 1 to access the user account 1 from the server system. In the example, after accessing the user account 1, the user 1 uses the input device to provide the textual description 318 in the text field 106. Upon receiving the textual description 318 with the request to generate the image 303, the AI models 302, which are trained, output the image 303 and provide the image 303 via the computer network to the client device operated by the user 1. The client device operated by the user 1 displays the image 303 on the display device 100 (FIG. 2) of the client device.

FIG. 4 is a diagram of an embodiment of a system 400 to illustrate a data parser 402. As an example, the data parser 402 is implemented as hardware or software or a combination thereof within the server system. Examples of the hardware include an application specification integrated circuit (ASIC) and a programmable logic device (PLD) or a central processing unit (CPU), or a microprocessor, or a microcontroller. Examples of the software include a computer software program executable by the CPU, or the microprocessor, or the microcontroller.

The data parser 402 receives or accesses the input data 301 (FIG. 3) and identifies from the input data 301, the textual descriptions 304, the images 306, the ages 308 of the users, the customizations 310 received from the users, the game title information 312 of game titles played by the users, the geographic locations 314 of the users, and the rules 316. For example, the data parser 402 receives the input data 301 via the computer network from the client devices operated by the users and parses the input data 301 to distinguish the textual descriptions 304 from the images 306, the ages 308, the customizations 310, the game title information 312, the geographic locations 314, and the rules 316. To illustrate, the data parser 402 determines that a first set of files received from the client devices have an image file extension, such as Joint Photographic Experts Group (JPEG), or Graphics Interchange Format (GIF), or Portable Network Graphic (PNG). In the illustration, the data parser 402 determines that a second set of files received from the client devices have a text file extension, such as TXT or Rich Text File (RTF). Further in the illustration, the data parser 402 distinguishes based on a difference between the text file extension and the image file extension that the first set of files include the images 306 and the second set of files include the textual descriptions 304. As another illustration, the data parser 402 determines that the first set of files are received via the computer network from one or more client devices with indications of selections of one or more upload buttons displayed on the one or more client devices to determine that the first set of files includes the images 306. As yet another illustration, the data parser 402 determines that the second set of files are received via the computer network from the one or more client devices with indications of selections of one or more generate image buttons displayed on the one or more client devices to determine that the second set of files includes the textual descriptions 304.

In the example, the data parser 402 determines that a portion of the input data 301 is received from the profile of a user account, such as the user account 1 or 2, assigned to a user, such as the user 1 or 2, and determines that the portion includes numbers to further determine that the portion includes the ages 308 of the user. In the example, the determination that the portion of the input data 301 includes the ages facilitates distinguishing the ages 308 from the textual descriptions 304, the images 306, the customizations 310, the game title information 312, the geographic locations 314, and the rules 316.

Moreover, in the example, the data parser 402 receives the input data 301 via the computer network from the client devices operated by the users, such as the user 1 and 2, and parses the input data 301 to distinguish the customizations 310 from the textual descriptions 304, the images 306, the ages 308, the game title information 312, the geographic locations 314, and the rules 316. To illustrate, the data parser 402 determines that a third set of files received from the client device operated by the user 1 have the image file extension and are received after the user 1 logs into the user account 1. In the example, the data parser 402 determines that a fourth set of files received from the client device operated by the user 1 have the text file extension and are received after the user 1 logs into the user account 1. Further in the example, the data parser 402 distinguishes based on a difference between the text file extension and the image file extension that the third set of files includes one or more images of the customizations 310 and the fourth set of files include the comments. In the illustration, the data parser 402 determines that each of the third and fourth sets of files are received via the computer network from the client device with indications of selections of the multimedia button displayed on the client device operated by the user 1 to determine that the third and fourth sets include the customizations 310.

Further in the example, the data parser 402 receives the input data 301 via the computer network from the client devices operated by the users and parses the input data 301 to distinguish the game title information 312 from the textual descriptions 304, the images 306, the ages 308, the customizations 310, the geographic locations 314, and the rules 316. To illustrate, the data parser 402 accesses a metadata database to access the metadata linked to a user account, such as the user account 1 or 2, assigned to a user, such as the user 1 or 2, to identify history of gameplay by the user. In the illustration, the history of gameplay includes the game titles played by the user. Further, in the illustration, the metadata database is stored within the server system.

Also in the example, the data parser 402 receives the input data 301 via the computer network from the client devices operated by the users and parses the input data 301 to distinguish the geographic locations 314 from the textual descriptions 304, the images 306, the ages 308, the customizations 310, the game title information 312, and the rules 316. To illustrate, the data parser 402 sends a request to the GPS system, such as the GPS receiver of the client device or a GPS transmitter of the GPS system or a combination thereof, via the computer network to obtain the geographic locations 314 of the client device operated by a user, such as the user 1 or 2. In the illustration, the geographic location is determined by the GPS system within the predetermined time window from receiving the textual description 104 after the user logs into a user account, such as the user account 1 or 2, assigned to the user. In the illustration, upon receiving the request, the GPS system provides the geographic locations 314 to the data parser 402.

In the example, the data parser 402 receives the input data 301 via the computer network from the client devices operated by the users and parses the input data 301 to distinguish the rules 316 from the textual descriptions 304, the images 306, the ages 308, the customizations 310, the game title information 312, and the geographic locations 314. To illustrate, the data parser 402 sends a request to the rules database to obtain the trademark rules or the copyright rules restricting use of terms that can be placed within the image 201 having the customized content 202 (FIG. 2). In the illustration, in response to the request, the data parser 402 receives the rules 316 from the rules database to identify any restrictions in use of the terms that can be placed within the image 201.

The data parser 402 also receives identities of the user accounts 1 and 2 from the user accounts 1 and 2. For example, the data parser 402 requests the server system for the identities of the user accounts 1 and 2 and in response, obtains the identities. An illustration of an identity of a user account is a set of alphanumeric characters used to distinguish one user account from another user account. To further illustrate, a first set of alphanumeric characters identify the user account 1 and a second set of alphanumeric characters, different from the first set, identify the user account 2.

FIG. 5A is a diagram of an embodiment of a system 500 to illustrate an image generation AI (IGAI) model 502. The system 500 includes an AI model 504. The IGAI model 502 and the AI model 504 are example of the AI models 302 (FIG. 3). The AI model 504 further includes an age identifier 506, an age classifier 508, a preference identifier 510, a game title identifier 514, a geographic location identifier 518, and a rules identifier 522. The system 500 also includes the IGAI model 502.

As an example, each of the age identifier 506, the age classifier 508, the preference identifier 510, the game title identifier 514, the geographic location identifier 518, and the rules identifier 522 is implemented as hardware or software or a combination thereof. The age identifier 506, the preference identifier 510, the game title identifier 514, the geographic location identifier 518, and the rules identifier 522 are coupled to the data parser 402 (FIG. 4). Also, the age classifier 508 is coupled to the age identifier 506. The age classifier 508, the preference identifier 510, the game title identifier 514, the geographic location identifier 518, and the rules identifier 522 are coupled to the IGAI model 502.

The age identifier 506 receives the ages 308 from the data parser 402 and an identity of a user account, such as the user account 1 or 2, and distinguishes among the ages 308 to output an identified age result 526. For example, the age identifier 506 accesses the ages 308, including the age 12 and the age 23 of the user 1, from the profile of the user account 1. Further, in the example, the age identifier 506 compares the ages 308 to determine that the age 18 is different from, such as less than the age 23. In the example, the identified age result 526 includes the ages 18 and 23 and an indication that the age 18 is less than the age 23 by six years. As another example, the age identifier 506 accesses the ages 308, including the ages of the user 2, from the profile of the user account 2. Further, in the example, the age identifier 506 compares the ages to determine that a first one of the ages is different from, such as greater or less than, a second one of the ages. In the example, the identified age result 526 includes the ages, the identities of the user accounts, such as the user accounts 1 and 2, and an indication of a difference between the ages.

The age classifier 508 receives the identified age result 526 and classifies the identified age result 526 into a category, such as child or adult, to output a classified age result 528. For example, the age classifier 508 compares the age of 12 of the user 1 with the child category and the adult category to determine that the age of 12 falls within the child category, and also compares the age of 23 of the user 1 with the child category and the adult category to determine that the age of 23 falls within the adult category. In the example, the child category includes ages less than 18 and the adult category includes ages of 18 and above. In the example, an indication that the age of 12 of the user 1 falls within the child category is the classified age result 528, the identities of the user accounts, and an indication that the age 23 the user 1 falls within the adult category are examples of the classified age result 528. The classified age result 528 is provided to the IGAI model 502 by the age classifier 508. As another example, ages of the user 2 are classified in the same manner as that illustrated above with respect to the ages of the user 1.

It should be noted that each of the ages 308 of the users, such as the user 1 and 2, is identified, classified, and provided to the IGAI model 502 within a predetermined time window from a time at which a respective textual description, such as the textual description 318, is received by the IGAI model 502 to train the IGAI model 502. For example, the classified age result 528 having the age of 12 is received within the predetermined time window from a time at which the textual description 318 is received by the IGAI model 502 via the computer network from the client device operated by the user 1. In the example, the textual description 318 is received after the user 1 logs into the user account 1. In the example, the classified age result 528 having the age of 23 is received within the predetermined time window from a time at which another textual description is received by the IGAI model 502 via the computer network from the client device operated by the user 1 in a similar manner as that of receiving the textual description 318. To illustrate, the other textual description, such as "Flying person", is received within the text field 106 from the user 1 via the input device after the user 1 logs into the user account 1 and the user 1 has the age of 23.

The preference identifier 510 receives the customizations 310 along with identities of the user accounts, such as the user accounts 1 and 2, used to make the customizations 310 from the data parser 402 and differentiates among the customizations 310 to output an identified customization result 530. For example, the preference identifier 510 receives the customizations 310 and parses the customizations 310 to determine a meaning or connotation or a combination thereof of the customizations 310. To illustrate, the preference identifier 501 receives a comment that the term "Cool!" be placed on an image of a cool hoodie, and accesses an online dictionary to determine a meaning or connotation or a combination thereof of each word of the term. Also, in the illustration, the comment is received within the chat session or within the multimedia field. In the illustration, the meaning or connotation or a combination thereof is that a user, such as the user 1 or 2, has indicated via a user account, such as the user account 1 or 2, assigned to the user that the user prefers the term to be placed on the image of the cool hoodie. In the illustration, the meaning or connotation that the user prefers the term to be placed on the image of the cool hoodie and the identity of the user account assigned to the user are an example of the identified customization result 530.

As another illustration, the preference identifier 501 receives a comment, "I do not like this hoodie" via a user account, such as the user account 1 or 2, and accesses an online dictionary to determine a meaning or connotation or a combination thereof of each word of the comment. Also, in the illustration, the comment is received within the chat session or within the multimedia field. In the illustration, the meaning or connotation or a combination thereof is that a user, such as the user 1 or 2, who is assigned the user account does not like the hoodie. In the illustration, the meaning or connotation or a combination thereof is that the user does not like the hoodie is an example of the identified customization result 530.

As yet another illustration, the preference identifier 501 receives a comment, "This is not good" within a predetermined time window after which the general content 110 (FIG. 1) is displayed. In the illustration, the comment is received from a user, such as the user 1 or 2, after the user logs into a user account, such as the user account 1 or 2, assigned to the user. In the illustration, the preference identifier 501 includes a clock that counts whether the predetermined time window has not passed between a time at which the general content 110 is displayed and a time at which the comment is received. In the illustration, upon determining that the predetermined time window has not passed, the preference identifier 501 determines that "This", within the comment, refers to the general content 110 or the inappropriate content 116 (FIG. 1). In the illustration, the preference identifies 510 determines that a meaning or connotation or a combination thereof of "This is not good" is that the general content 110 or the inappropriate content 116 Is inappropriate. In the illustration, the meaning or connotation or a combination thereof that the general content 110 or the inappropriate content 116 is inappropriate is an example of the identified customization result 530. The preference identifier 510 provides the identified customization result 530 to the IGAI model 502.

The game title identifier 514 receives the game title information 312 from the data parser 402 along with the identities of the user accounts 1 and 2 and distinguishes among data of the game title information 312 to output an identified title result 532. For example, the game title identifier 514 parses the game titles to identify that the first game title is different from the second game title. Also, in the example, the game title identifier 514 identifies that the first game title is played by one or more users, such as the users 1 and 2, during multiple game sessions via respective one or more user accounts, such as the user accounts 1 and 2, assigned to the one or more users for a first total amount of time, which is greater than a second total amount of time for which the second game title is played by the one or more users during multiple game sessions via the one or more user accounts. The first total amount of time is a sum of amounts of time for which the first game title is played by the one or more users after logging into the respective one or more user accounts during multiple game sessions of the first game title and the second amount of time is a sum of amounts of time for which the second game title is played by the one or more users after logging into the one or more user accounts during multiple game sessions of the second game title. In the example, the game title identifier 514 calculates the first and second sums. Further, in the example, the game title identifier 514 identifies that the first game title is played by the one or more users with a first frequency, which is greater than a second frequency with which the second game title is played by the one or more users. In the example, each game session of a game title is equal to a frequency of game play of the game title. The game title identifier 514 counts a number of the game sessions of game play of the first game title to calculate the first frequency and a number of the game sessions of game play of the second game title to calculate the second frequency. In the example, the identified title result 532 includes the game titles God of War™ and Gran Turismo 7™, an indication that the first amount of time is greater than the second amount of time, an indication that the first frequency is greater than the second frequency, and the identities of the user accounts. Further, in the example, the indication that the first amount of time is greater than the second amount of time or the first frequency is greater than the second frequency or a combination thereof indicates that the one or more users prefer to play the first game title compared to the second game title. In the example, the preference to play the first game title is a part of the identified title result 532. The game title identifier 514 provides the identified title result 532 to the IGAI model 502.

The geographic location identifier 518 receives the geographic locations 314 of a user, such as the user 1 or 2, from the data parser 402 along with the identity of a user account, assigned to the user, and distinguishes among the geographic locations 314 to output an identified location result 534. For example, the geographic location identifier 518 receives the geographic locations 314, such as a latitude and longitude of China or a latitude and longitude of India, of a user, such as the user 1 or 2, determined after the user accesses a user account, such as the user account 1 or 2, assigned to the user, and compares the geographic locations 314 with predetermined geographic locations, such as China and India, to determine that the user is in China at a first time and in India at a second time. In the example, the first time is within a preset time period from receipt of the textual description 318 from the client device operated by the user and the second time is within the preset time period from receipt of the other textual description from the client device. In the example, the other textual description is received by the IGAI model 502 via the computer network from the client device operated by the user in a similar manner as that of receiving the textual description 318. Also, in the example, the geographic location identifier 518 accesses the first and second times from an Internet clock source. To illustrate, the geographic location identifier 518 sends a request to the Internet clock source for the first and second times and in response, obtains the first and second times.

Further, in the example, the geographic location identifier 518 identifies a festival, such as Chinese New Year or Diwali, that is currently occurring based on the first or the second time and the identified geographic locations, such as China and India. To illustrate, the geographic location identifier 518 accesses the Internet to identify that Chinese New Year is celebrated in China within a predetermined time period from the first time or Diwali is celebrated in India within the predetermined time period from the second time. In the example, countries, such as China and India, that are identified, the first and second times, the festivals identified, and the identities of the user accounts are illustrations of the identified location result 534. The geographic location identifier 518 provides the identified location result 534 to the IGAI model 502.

The rules identifier 522 receives the rules 316 from the data parser 402 and identifies restrictions imposed by the rules 316 to output an identified rule result 536. For example, the rules identifier 522 parses the trademark rules to determine that the trademark rules prohibit a display of the term, "Spider-Man™", and a display of the image of Spider-Man™. In the example, an indication of the prohibition is an example of the identified rule result 536. The rules identifier 522 provides the identified rule result 536 to the IGAI model 502. The IGAI model 502 is trained based on the classified age result 528, the identified customization result 530, the identified title result 532, the identified location result 534, and identified rule result 536 and applies the training to process the textual description 318 to generate the image 303. The training is described below.

Although a flow is directed from the AI model 504 to the IGAI model 502, in an embodiment, a reverse flow is directed from the IGAI model 502 to the AI model 504. For example, the IGAI model 502 produces image data for displaying an image, such as the image 102 (FIG. 1), based on the textual description 104, and the image data is provided to the AI model 504 for training the AI model 504. The AI model 504 learns how to customize the image data based on the ages 308, the customizations 310, the game title information 312, the geographic locations 314, and the rules 316 to output customized data. The AI model 504 provides the customized data to the IGAI model 502. The IGAI model 502 applies the customized data to modify the image to output a customized image, such as the image 202 (FIG. 2).

FIG. 5B is a diagram of an embodiment of a system 540 to illustrate training of the IGAI model 502 based on the textual descriptions 304 and the images 306 in addition to the ages 308, the customizations 310, the game title information 312, the geographic locations 314, and the rules 316 (FIG. 5A). The system 540 includes input data 543 and the IGAI model 502. The input data 543 includes the textual descriptions 304 and the images 306. The IGAI model 502 includes an encoder 542, a noise adder 544, a noise subtractor 546, an image identifier 548, a textual description identifier 551, a decoder 555, and a conditioner 557. The image identifier 548 includes a substantive image data identifier 552 and a noise identifier 556.

Each of the encoder 542, the noise adder 544, the noise subtractor 546, the textual description identifier 551, the textual description classifier 553, the decoder 555, the conditioner 557, the substantive image data identifier 552, and the noise identifier 556 is implemented as hardware or software or a combination thereof. The encoder 542 and the textual description identifier 551 are coupled to the data parser 402. The encoder 542 is coupled to the noise adder 544, which is coupled to the noise subtractor 546, to the substantive image data identifier 552, and to the noise identifier 556. The noise subtractor 546 is also coupled to the substantive image data identifier 552 and the noise identifier 556. The substantive image data identifier 552 and the noise identifier 556 are coupled to the decoder 555. The decoder 555 is coupled to the conditioner 557. The textual description identifier 551 is coupled to the substantive image data identifier 552 and to the noise identifier 556.

The encoder 542 encodes, such as modifies or converts or compresses, the images 306 to output encoded image data 560. For example, the encoder 542 modifies image data of the images 306 from a pixel space to a latent space to reduce an amount of information within the images 306. In the example, the reduced amount of information, including vectors, is an example of the encoded image data 560. Random noise 562 is added by the adder 544 to the encoded image data 560 to output noisy image data 564. For example, a first amount of the random noise 562 is added to a first set of the encoded image data 560 to output a first set of the noisy image data 564 and a second amount of the random noise 562 is added to a second set of the encoded image data 560 to output a second set of the noisy image data 564.

The noise subtractor 546 subtracts a random noise 566 from the noisy image data 564 to output denoisy image data 568. For example, a first amount of the random noise 566 is subtracted from the first set of the noisy image data 564 to output a first set of the denoisy image data 568 and a second amount of the random noise 566 is subtracted from a second set of the denoisy image data 566 to output a second set of the denoisy image data 568.

The substantive image identifier 552 receives the noisy image data 564 from the noise adder 544 and the denoisy image data 568 from the noise subtractor 546, and identifies substantive data within the noisy image data 564 and the denoisy image data 568 to output identified substantive image data 570. For example, the substantive image identifier 552 determines whether a first portion of the noisy image data 564 and a first portion of the denoisy image data 568 have information for generating a virtual character or a virtual background of an image, and upon determining so, determines that the first portions are the identified substantive image data 570. To illustrate, upon determining that a space between a first subportion of the first portion of the noisy image data 564 or the denoisy image data 568 and a second subportion of the first portion of the noisy image data 564 or the denoisy image data 568 is less than a predetermined threshold, the noise identifier 556 determines that the first portion of the noisy image data 564 or the denoisy image data 568 includes information for generating the virtual character or the virtual background. Examples of the virtual character include the virtual user 112, the virtual hoodie 114, the inappropriate content 116 (FIG. 1), the virtual hoodie 204, the virtual belt 206, the virtual dragon 208, the virtual symbol 210, and the virtual word 212 (FIG. 2).

Moreover, the noise identifier 556 receives the noisy image data 564 from the noise adder 544 and the denoisy image data 568 from the noise subtractor 546, and identifies noise data within the noisy image data 564 and the denoisy image data 568 to output identified noise image data 572. For example, the noise identifier 556 determines whether a second portion of the noisy image data 564 or the denoisy image data 568 lacks the information for generating the virtual character or the virtual background of the image, and upon determining so, determines that the second portion is the identified noise image data 572. To illustrate, upon determining that a space between a first subportion of the second portion of the noisy image data 564 or the denoisy image data 568 and a second subportion of the second portion of the noisy image data 564 or the denoisy image data 568 is greater than the predetermined threshold, the noise identifier 556 determines that the second portion of the noisy image data 564 or the denoisy image data 568 lacks the information for generating the virtual character or the virtual background.

The substantive image data identifier 552 provides the identified substantive image data 570 to the decoder 555 and to the textual description identifier 551, and the noise identifier 556 provides the identified noise image data 572 to the decoder 555 and to the textual description identifier 551. The decoder 555 decodes, such as converts or decompresses or modifies, the identified substantive image data 570 and the identified noise image data 572 to output decoded images 574. For example, the decoder 555 converts the identified substantive image data 570 and the identified noise image data 572 from the latent space back to the pixel space to output the decoded images 574. To illustrate, the decoded images 574 have a greater amount of information compared to any of the identified substantive image data 570 and the identified noise image data 572. As another illustration, the decoder 555 combines a portion of the identified noise image data 572 with a portion of the identified substantive image data 570 to form one of the decoded images 574. Each of the decoded images 574 includes a combination of a portion of the identified substantive image data 570 and a portion of the identified noise image data 572.

The decoded images 574 are provided from the decoder 555 to the conditioner 557. The conditioner 557 applies one or more constraints to condition the decoded images 574 to output conditioned images 576. For example, the conditioner 557 upscales the decoded images 574 according to a predetermined upscaling factor to add information to the decoded images 574. To illustrate, the conditioner 557 increases resolutions of the decoded images 574 according to a predetermined resolution to output the conditioned images 576. Also, in the example, the conditioner 557 extrapolates various portions of each of the decoded images 574 to join the various portions according to the identified substantive image data 570 to generate each of the conditioned images 576. To illustrate, upon determining, from the identified substantive image data 570, that a portion of virtual sleeve of the cool hoodie is missing from an image of the cool hoodie, the conditioner 557 joins portions of the virtual hoodie that are present in the image of the cool hoodie to generate the missing portion. The predetermined upscaling factor, the predetermined resolution, and the identified substantive image data 570 are examples of the constraints.

The textual description identifier 551 receives the textual descriptions 304 along with any identities of the user accounts from the data parser 402, receives the identified substantive image data 570 from the substantive image data identifier 552, receives the identified noise image data 572 from the noise identifier 556, and determines meanings or connotations or a combination thereof of the textual descriptions 304 to output identified textual data 575. Some of the textual descriptions 304 are provided by a user, such as the user 1 or 2, after accessing a user account, such as the user account 1 or 2, assigned to the user. The meanings or connotations or a combination thereof of the textual descriptions 304 are determined based on the identified substantive image data 570 or the identified noise image data 572 or a combination thereof. As an example, the textual description identifier 551 receives the first textual description, “cool shirt”, within a predetermined time period from a time at which a first portion of the identified substantive image data 570 of the cool shirt is received from the substantive image data identifier 552 and a time at which a first portion of the identified noise image data 572 is received from the noise identifier 556 to determine that the first portion of the identified substantive image data 570 represents, such as depicts or is indicative of, the “cool shirt” of the first textual description. In the example, upon determining that the first portion of the identified substantive image data 570 represents the “cool shirt” of the first textual description, the textual description identifier 551 determines that the first portion of the identified substantive image data 570 is similar to the “cool shirt” of the first textual description.

Moreover, in the example, the textual description identifier 551 receives the second textual description, “ugly pants”, within the predetermined time period from a time at which a second portion of the identified substantive image data 570 of the ugly pants is received from the substantive image data identifier 552 and a time at which a second portion of the identified noise image data 572 is received from the noise identifier 556 to determine that the second portion of the identified substantive image data 570 represents the “ugly pants”. In the example, upon determining that the second portion of the identified substantive image data 570 represents the “ugly pants” of the second textual description, the textual description identifier 551 determines that the second portion of the identified substantive image data 570 is similar to the “ugly pants” of the second textual description.

In the example, the textual description identifier 551 receives the third textual description, “awesome jacket”, within the predetermined time period from a time at which a third portion of the identified substantive image data 570 of the awesome jacket is received from the substantive image data identifier 552 and a time at which a third portion of the identified noise image data 572 is received from the noise identifier 556 to determine that the third portion of the identified substantive image data 570 represents the “awesome jacket”. In the example, upon determining that the third portion of the identified substantive image data 570 represents the “awesome jacket” of the third textual description, the textual description identifier 551 determines that the third portion of the identified substantive image data 570 is similar to the “awesome jacket” of the third textual description.

Further, in the example, the textual description identifier 551 receives the fourth textual description, “hoodie”, within the predetermined time period from a time at which a fourth portion of the identified substantive image data 570 of the hoodie is received from the substantive image data identifier 552 and a time at which a fourth portion of the identified noise image data 572 is received from the noise identifier 556 to determine that the fourth portion of the identified substantive image data 570 represents “hoodie”. In the example, upon determining that the fourth portion of the identified substantive image data 570 represents the “hoodie” of the fourth textual description, the textual description identifier 551 determines that the fourth portion is similar to the “hoodie” of the fourth textual description. In the example, an indication that the first portion of the identified substantive image data 570 is similar to the first textual description, “cool shirt”, an indication that the second portion of the identified substantive image data 570 is similar to the second textual description, “ugly pants”, an indication that the third portion of the identified substantive image data 570 is similar to the third textual description, “awesome jacket”, an indication that the fourth portion of the identified substantive image data 570 is similar to the fourth textual description, “hoodie”, and any identities of the user accounts 1 and 2 received from the data parser 402 are examples of the identified textual data 575.

The IGAI model 502 is trained based on the identified textual data 575, the classified age result 528 (FIG. 5A), the identified customization result 530 (FIG. 5A), the identified title result 532, (FIG. 5A) the identified location result 534 (FIG. 5A), and the identified rule result 536 (FIG. 5A), the identified substantive image data 570, and the identified noise image data 572 and applies the training to process the textual description 318 (FIG. 5A) to generate the image 303 (FIG. 5A). For example, the IGAI model 502 determines that a portion of the textual description 318 is similar to, such as has the same meaning or connotation or the same alphabets or a combination thereof, the fourth textual description, “hoodie”, of the identified textual data 575 and that the textual description 318 is similar to, such as has the same meaning or connotation or the same alphabets or a combination thereof, a portion of the first textual description, “cool shirt”, of the identified textual data 575. Also, in the example, upon determining so, the IGAI model 502 identifies, from the identified textual data 575, the first portion of the identified substantive image data 570 and the fourth portion of the identified substantive image data 570, and stitches a subportion of the first portion of the identified substantive image data 570, such as a portion representing the “cool” of the “cool shirt”, with the fourth portion of the identified substantive image data 570 to generate image data for displaying an image of the cool hoodie. Moreover, in the example, the IGAI model 502 determines, based on the classified age result 528 that the user 1 is a child, determines that a predetermined number, such as a majority, of images of the identified substantive image data 570 received via user accounts, such as the user accounts 1 and 2, that are assigned to users, such as the users 1 and 2, that are less than 18 years old excludes the inappropriate content 116 (FIG. 1), such as adult content. In the example, the indications that the users are less than 18 years old are stored within profiles of the user accounts of the users. Also, in the example, the predetermined number of images of the identified substantive image data 570 includes image data of the cool shirt and image data of the hoodie. In the example, upon determining that the user 1 is the child and that the predetermined number of the images of the identified substantive image data 570 excludes the inappropriate content 116, the IGAI model 502 determines to replace the inappropriate content 116 with the virtual symbol 210 (FIG. 2) on the image of the cool hoodie or to not include the inappropriate content 116 on the image of the cool hoodie.

Continuing with the example, the IGAI model 502 determines that the identified customization result 530 indicates that a predetermined number, such as a majority, of comments received from the one or more users, such as the user 1, via their respective one or more user accounts indicate to place the image of the term “Cool!” on images of hoodies. In the example, upon determining so, the IGAI model 502 determines to place the term “Cool!” on the image of the cool hoodie. In the example, the IGAI model 502 accesses an image of the term “Cool!” from the conditioned images 576 or the identified substantive image data 570 or a combination thereof.

Further, in the example, the IGAI model 502 determines that the identified title result 532 indicates that a predetermined number, such as a majority, of game titles played by one or more of the users, such as the user 1 and the user 2, via their respective one or more of the user accounts indicate that the one or more users prefer to play a first game title, such as God of War™, compared to a second game title, such as Gran Turismo 7™ In the example, upon determining so, the IGAI model 502 determines to place the virtual belt 206 (FIG. 2) on the image of the cool hoodie. In the example, the virtual belt 206 signifies Kratos™, who is a main virtual character in the first game title. In the example, the IGAI model 502 accesses an image of the virtual belt 206 from the conditioned images 576 or the identified substantive image data 570 or a combination thereof.

Also, in the example, the IGAI model 502 determines that the identified location result 534 indicates that the user 1 is in China and there is an occurrence of the festival of the Chinese New Year. In the example, upon determining so, the IGAI model 502 determines to place the virtual dragon 208 (FIG. 2) on the image of the cool hoodie. In the example, the IGAI model 502 accesses an image of the virtual dragon 208 from the conditioned images 576.

In the example, the IGAI model 502 determines that the identified rule result 536 indicates that an image of the term "Spider-Man™" cannot be used on the image of the cool hoodie. In the example, upon determining so, the IGAI model 502 determines not to place the image of the term "Spider-Man™" on the image of the cool hoodie. In the example, the conditioner 557 conditions the image of the cool hoodie to output a conditioned image of the cool hoodie. To illustrate, the conditioner 557 adds missing portions to the image of the cool hoodie, or increases a resolution of the image of the cool hoodie, or a combination thereof, to output the conditioned image. The conditioned image of the cool hoodie is an example of the image 303 (FIG. 3) output from the IGAI model 502. In the example, the IGAI model 502 sends the conditioned image of the cool hoodie via the computer network to the client device operated by the user 1 in response to receiving the textual description 318 with the request to generate the image of the cool hoodie.

In one embodiment, the generation of an output image, graphics, and/or three-dimensional representation by an IGAI model, described herein, can include one or more artificial intelligence processing engines and/or models. In general, an AI model, described herein, is trained using training data from a data set. The data set selected for training can be custom curated for specific desired outputs and in some cases the training data set can include wide ranging generic data that can be consumed from a multitude of sources over the Internet. By way of example, an IGAI model has access to a vast of amount of data, e.g., images, videos and three-dimensional data. The generic data is used by the IGAI model to gain understanding of the type of content desired by an input. For instance, if the input is requesting the generation of a tiger in the Sahara desert, the data set should have various images of tigers and deserts to access and draw upon during the processing of an output image. The curated data set, on the other hand, maybe more specific to a type of content, e.g., video game related art, videos and other asset related content. Even more specifically, the curated data set could include images related to specific scenes of a game or actions sequences including game assets, e.g., unique avatar characters and the like. As described above, the IGAI model is customized to enable entry of unique descriptive language statements to set a style for the requested output images or content. The descriptive language statements can be text or other sensory input, e.g., inertial sensor data, input speed, emphasis statements, and other data that can be formed into an input request. The IGAI model can also be provided images, videos, or sets of images to define the context of an input request. In one embodiment, the input can be text describing a desired output along with an image or images to convey the desired contextual scene being requested as the output.

In one embodiment, an IGAI model is provided to enable text-to-image generation. Image generation is configured to implement latent diffusion processing, in a latent space, to synthesize the text to image processing. In one embodiment, a conditioning process assists in shaping the output toward the desired using output, e.g., using structured metadata. The structured metadata may include information gained from a user input to guide a machine learning model to denoise progressively in stages using cross attention until the processed denoising is decoded back to a pixel space. In the decoding stage, upscaling is applied to achieve an image, video, or three-dimensional (3D) asset that is of higher quality. The IGAI model is therefore a custom tool that is engineered to processing specific types of input and render specific types of outputs. When the IGAI model is customized, the machine learning and deep learning algorithms are tuned to achieve specific custom outputs, e.g., such as unique image assets to be used in gaming technology, specific game titles, and/or movies.

In another configuration, the IGAI model can be a third-party processor, e.g., such as one provided by Stable Diffusion™ or others, such as OpenAI's GLIDE™ DALL-E™, MidJourney™ or Imagen™. In some configurations, the IGAI model can be used online via one or more Application Programming Interface (API) calls. It should be understood that reference to available IGAI is only for informational reference. For additional information related to IGAI technology, reference may be made to a paper published by Ludwig Maximilian University of Munich titled "High-Resolution Image Synthesis with Latent Diffusion Models", by Robin Rombach, et al., pp. 1-45. This paper is incorporated by reference.

FIG. 6A is a general representation of a processing sequence of an IGAI model 602, in accordance with one embodiment. The IGAI model 502 (FIG. 5B) is an example of the IGAI model 602. As shown, input 606 is configured to receive input in the form of data, e.g., text description having semantic description or key words. The text description can in the form of a sentence, e.g., having at least a noun and a verb. The text description can also be in the form of a fragment or simply one word. The text can also be in the form of multiple sentences, which describe a scene or some action or some characteristic. In some configuration, the input text can also be input in a specific order so as to influence the focus on one word over others or even deemphasize words, letters or statements. Still further, the text input can be in any form, including characters, emojis, ions, foreign language characters (e.g., Japanese, Chinese, Korean, etc.). In one embodiment, text description is enabled by contrastive learning. The basic idea is to embed both an image and text in a latent space so that text corresponding to an image maps to the same area in the latent space as the image. This abstracts out the structure of what it means to be a dog for instance from both the visual and textual representation. In one embodiment, a goal of contrastive representation learning is to learn an embedding space in which similar sample pairs stay close to each other while dissimilar ones are far apart. Contrastive learning can be applied to both supervised and unsupervised settings.

When working with unsupervised data, contrastive learning is one of the most powerful approaches in self-supervised learning.

In addition to text, the input can also include other content, e.g., such as images or even images that have descriptive content themselves. Images can be interpreted using image analysis to identify objects, colors, intent, characteristics, shades, textures, three-dimensional representations, depth data, and combinations thereof. Broadly speaking, the input 606 is configured to convey the intent of a user, described herein, that wishes to utilize the IGAI model 602 to generate some digital content. In the context of game technology, the target content to be generated can be a game asset for use in a specific game scene. In such a scenario, the data set used to train the IGAI model 602 and input 606 is used to customize the way artificial intelligence, e.g., deep neural networks process the data to steer and tune the desired output image, data or three-dimensional digital asset.

The input 606 is then passed to the IGAI model 602, where an encoder 608 takes input data and/or pixel space data and coverts into latent space data. The encoder 608 is an example of the encoder 542 (FIG. 5B). The concept of "latent space" is at the core of deep learning, since feature data is reduced to simplified data representations for the purpose of finding patterns and using the patterns. The latent space processing 610 is therefore executed on compressed data, which significantly reduces the processing overhead as compared to processing learning algorithms in the pixel space, which is much more heavy and would require significantly more processing power and time to analyze and produce a desired image. The latent space is simply a representation of compressed data in which similar data points are closer together in space. In the latent space, the processing is configured to learn relationships between learned data points that a machine learning system has been able to derive from the information that it gets fed, e.g., the data set used to train the IGAI model 602. In latent space processing 610, a diffusion process is computed using diffusion models. Latent diffusion models rely on autoencoders to learn lower-dimension representations of a pixel space. The latent representation is passed through the diffusion process to add noise at each step, e.g., multiple stages. Then, the output is fed into a denoising network based on a U-Net architecture that has cross-attention layers. A conditioning process is also applied to guide a machine learning model to remove noise and arrive at an image that represents closely to what was requested via user input. A decoder 612 then transforms a resulting output from the latent space back to the pixel space. The decoder 614 is an example of the decoder 555 (FIG. 5B). The output 614 may then be processed to improve the resolution. The output 614 is then passed out as the result, which may be an image, graphics, 3D data, or data that can be rendered to a physical form or digital form.

Figure 6B:
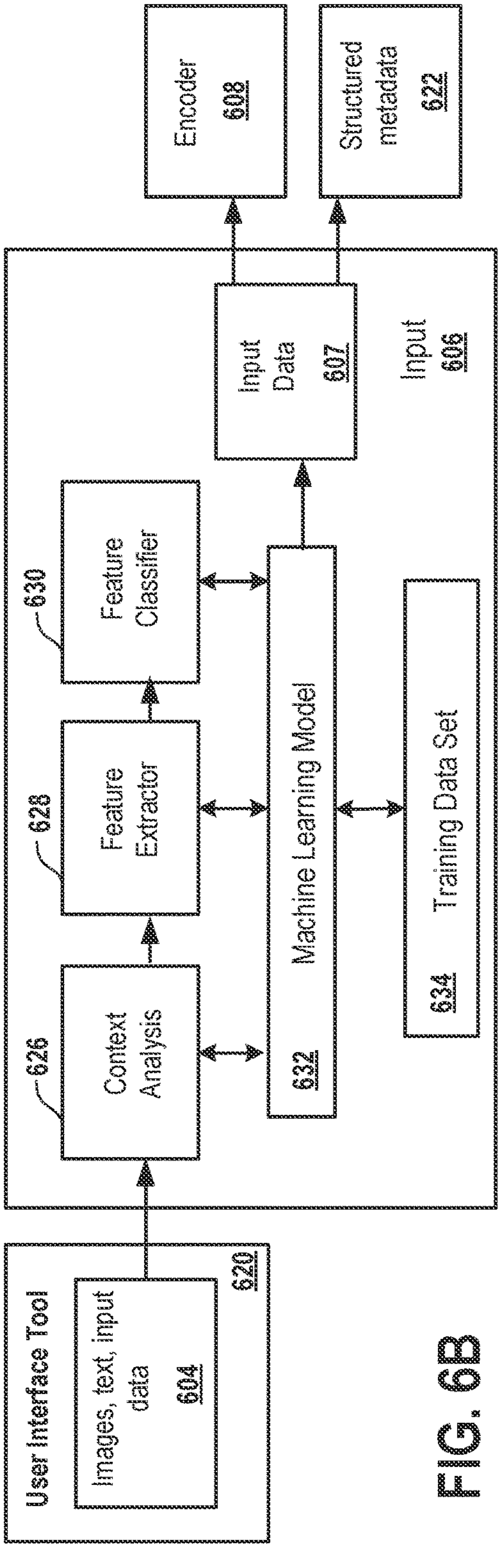
FIG. 6B illustrates, in one embodiment, additional processing that is applied to an input of the IGAI model of FIG. 6A.

FIG. 6B illustrates, in one embodiment, additional processing that may be done to the input 606. A user interface tool 620 may be used to enable the user to provide an input request 604. The input request 604, as discussed above, may be images, text, structured text, or generally data. The input request 604 is an example of the input data 301 (FIG. 3). In one embodiment, before the input request is provided to the encoder 608, the input can be processed by a machine learning process that generates a machine learning model 632, and learns from a training data set 634. The machine learning model 632 is an example of the one or more AI models 302 (FIG. 3). By way of example, the input data is processed to via a context analyzer 626 to understand the context of the request. For example, if the input is "space rockets for flying to the mars", the input is analyzed by the context analyzer 626 to determine that the context is related to outer space and planets. The context analysis uses machine learning model 632 and training data set 634 to find related images for this context or identify specific libraries of art, images or video. If the input request also includes an image of a rocket, the feature extractor 628 functions to automatically identify feature characteristics in the rocket image, e.g., fuel tank, length, color, position, edges, lettering, flames, etc. A feature classifier 630 is used to classify the features and improve the machine learning model 632. In one embodiment, the input data 607 is generated to produce structured information that can be encoded by encoder 608 into the latent space. Additionally, it is possible to extract out structured metadata 622 from the input request. The structured metadata 622 may be, for example, descriptive text used to instruct the IGAI model 602 to make a modification to a characteristic or change to the input images or changes to colors, textures, or combinations thereof. For example, the input request 604 could include an image of the rocket, and the text can say "make the rocket wider" or "add more flames" or "make it stronger" or some of other modifier intended by the user (e.g., semantically provided and context analyzed). The structured metadata 622 is then used in subsequent latent space processing to tune the output to move toward the user's intent. In one embodiment, the structured metadata is in the form of semantic maps, text, images, or data that is engineered to represent the user's intent as to what changes or modifications are to be made to an input image or content.

Figure 6C:
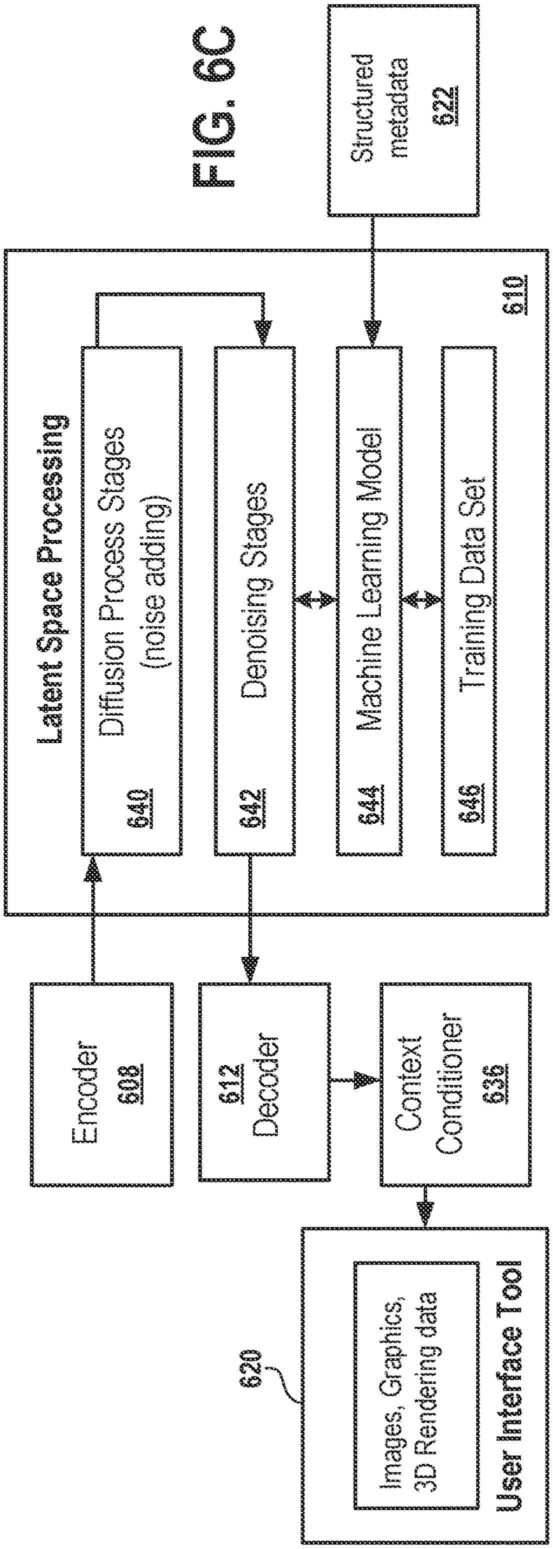
FIG. 6C illustrates how an output of an encoder is fed into a latent space processing, in accordance with one embodiment.

FIG. 6C illustrates how the output of the encoder 608 is then fed into latent space processing 610, in accordance with one embodiment. A diffusion process is executed by diffusion process stages 640, wherein the input is processed through a number of stages to add noise to the input image or images associated with the input text. This is a progressive process, where at each stage, e.g., 10-50 or more stages, noise is added. Next, a denoising process is executed through denoising stages 642. Similar to the noise stages, a reverse process is executed where noise is removed progressively at each stage, and at each stage, machine learning is used to predict what the output image or content should be, in light of the input request intent. In one embodiment, the structured metadata 622 is used by a machine learning model 644 at each stage of denoising, to predict how the resulting denoised image should look and how it should be modified. The machine learning model 644 is an example of the one or more AI models 302 (FIG. 3). During these predictions, the machine learning model 644 uses the training data set 646 and the structured metadata 622, to move closer and closer to an output that most resembles the requested in the input. In one embodiment, during the denoising, a U-Net architecture that has cross-attention layers may be used, to improve the predictions. After the final denoising stage, the output is provided to the decoder 612 that transforms that output to the pixel space. In one embodiment, the output is also upscaled to improve the resolution. The output of the decoder 612, in one embodiment, can be optionally run through a context conditioner 636, which is an example of the conditioner 557 (FIG. 5B). The context conditioner 636 is a process that may use machine learning to examine the resulting output to make adjustments to make the output more realistic or remove unreal or unnatural outputs. For example, if the input asks for "a boy pushing a lawnmower" and the output shows a boy with three legs, then the context conditioner can make adjustments with in-painting processes or overlays to correct or block the inconsistent or undesired outputs. However, as the machine learning model 644 gets smarter with more training over time, there will be less need for a context conditioner 636 before the output is rendered in the user interface tool 620.

FIG. 7 is a diagram of an embodiment of a system 700 to illustrate use of client devices 1 and 2 by the users 1 and 2 with a server system 702. The system 700 includes the client devices 1 and 2, a computer network 704, and the server system 702. The server system 702 includes one or more servers, an example of which is illustrated below in FIG. 8. Each server includes one or more processors and one or more memory devices. The one or more processors are coupled to the one or more memory devices. An example of a processor is a CPU or a microcontroller or a microprocessor. Examples of a memory device include a read-only memory (ROM) and a random access memory (RAM).

The server system 702 includes an image generation processor (IGP) system 704 and a memory device system 706. The IGP system 704 includes one or more processors and the memory device system 706 includes one or more memory devices. The IGP system 704 is coupled to the memory device system 706. The IGP system 704 executes the one or more AI models 302 (FIG. 3). The user accounts 1 and 2 are stored in the memory device system 706 for access by the IGP system 704.

Figure 8:
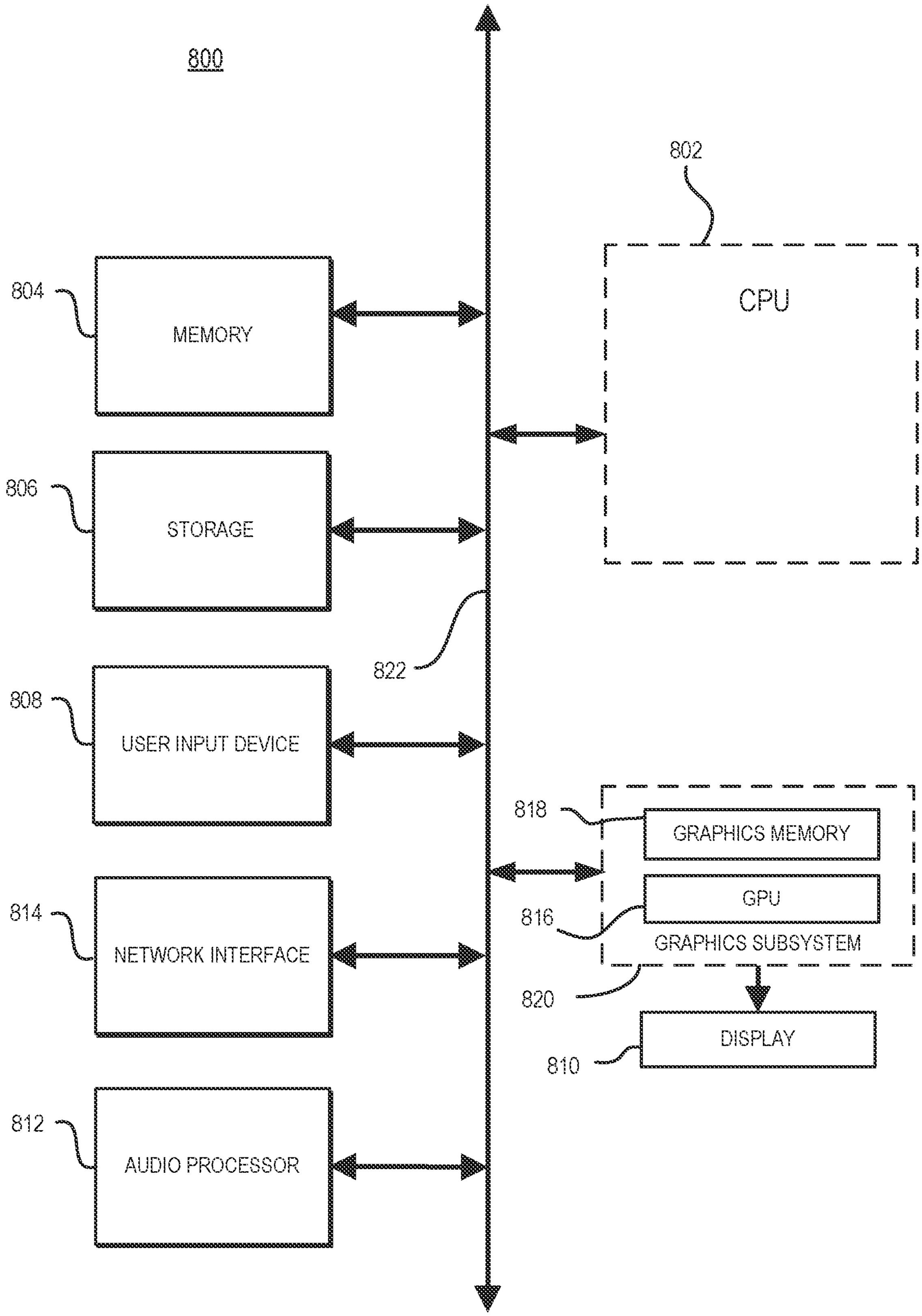
FIG. 8 illustrates components of an example device that is used to perform aspects of the various embodiments of the present disclosure.

FIG. 8 illustrates components of an example device 800 that can be used to perform aspects of the various embodiments of the present disclosure. This block diagram illustrates the device 800 that can incorporate or can be a personal computer, a smart phone, a video game console, a personal digital assistant, a server or other digital device, suitable for practicing an embodiment of the disclosure. The device 800 includes a CPU 802 for running software applications and optionally an operating system. The CPU 802 includes one or more homogeneous or heterogeneous processing cores. For example, the CPU 802 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 800 can be a localized to a player playing a game segment (e.g., game console), or remote from the player (e.g., back-end server processor), or one of many servers using virtualization in a game cloud system for remote streaming of gameplay to clients.

A memory 804 stores applications and data for use by the CPU 802. A storage 806 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 808 communicate user inputs from one or more users to the device 800. Examples of the user input devices 808 include keyboards, mouse, joysticks, touch pads, touch screens, still or video recorders/cameras, tracking devices for recognizing gestures, and/or microphones. A network interface 814 allows the device 800 to communicate with other computer systems via an electronic communications network, and may include wired or wireless communication over local area networks and wide area networks, such as the internet. An audio processor 812 is adapted to generate analog or digital audio output from instructions and/or data provided by the CPU 802, the memory 804, and/or data storage 806. The components of device 800, including the CPU 802, the memory 804, the data storage 806, the user input devices 808, the network interface 814, and an audio processor 812 are connected via a data bus 822.

A graphics subsystem 820 is further connected with the data bus 822 and the components of the device 800. The graphics subsystem 820 includes a graphics processing unit (GPU) 816 and a graphics memory 818. The graphics memory 818 includes a display memory (e.g., a frame buffer) used for storing pixel data for each pixel of an output image. The graphics memory 818 can be integrated in the same device as the GPU 816, connected as a separate device with the GPU 816, and/or implemented within the memory 804. Pixel data can be provided to the graphics memory 818 directly from the CPU 802. Alternatively, the CPU 802 provides the GPU 816 with data and/or instructions defining the desired output images, from which the GPU 816 generates the pixel data of one or more output images. The data and/or instructions defining the desired output images can be stored in the memory 804 and/or the graphics memory 818. In an embodiment, the GPU 816 includes three-dimensional (3D) rendering capabilities for generating pixel data for output images from instructions and data defining the geometry, lighting, shading, texturing, motion, and/or camera parameters for a scene. The GPU 816 can further include one or more programmable execution units capable of executing shader programs.

The graphics subsystem 814 periodically outputs pixel data for an image from the graphics memory 818 to be displayed on the display device 810. The display device 810 can be any device capable of displaying visual information in response to a signal from the device 800, including a cathode ray tube (CRT) display, a liquid crystal display (LCD), a plasma display, and an organic light emitting diode (OLED) display. The device 800 can provide the display device 810 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUs.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD.

The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, compact disc-read only memories (CD-ROMs), CD-recordables (CD-Rs), CD-rewritables (CD-RWs), magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method, comprising:

receiving, from a user device, a plurality of initial images and a plurality of textual descriptions specifying desired content for a target image;

encoding the plurality of textual descriptions to generate an embedding vector representing the plurality of textual descriptions in a latent space;

receiving noisy image data by:

encoding the plurality of initial images to the latent space; and adding a random noise to the plurality of encoded initial images;

inputting the embedding vector and the noisy image data to an artificial intelligence (AI) model; and generating, by using the AI model, a denoisy image corresponding to the target image based on the embedding vector, wherein the AI model outputs the target image by executing a denoising process that includes selecting image features in the noisy image data that correspond to semantic features in the embedding vector by identifying, based on the embedding vector, a plurality of sub-portions for each of the plurality of initial images as representing substantive image data, removing noise from the selected image features to create denoised image features, and combining the denoised image features into the target image by stitching the plurality of sub-portions having denoised image features together to form the target image.

2. The method of claim 1, further comprising training the AI model based on a plurality of training images and a plurality of training textual descriptions, wherein the plurality of training images are different from the plurality of initial images, wherein the plurality of training textual descriptions are different from the plurality of textual descriptions, and wherein said training the AI model includes determining a similarity between each of the plurality of textual descriptions and a respective one of the plurality of initial images.

3. The method of claim 1, wherein generating, by using the AI model, the denoisy image includes determining a similarity between portions of the embedding vector.

4. The method of claim 1, further comprising:

accessing a user account to identify a characteristic of a user and a profile of the user, wherein the profile of the user includes an age of the user and the characteristic includes a geographic location of the user, a plurality of game titles played by the user via the user account, a comment made by the user, and a preference of the user, and wherein the profile is stored within the user account; and generating the denoisy image corresponding to the target image based on the characteristic and the profile.

5. The method of claim 1, further comprising receiving a plurality of corresponding geographic locations within a predetermined time period from receiving the plurality of textual descriptions.

6. The method of claim 1, further comprising:

conditioning the denoisy image corresponding to the target image by upscaling the target image to confirm that the target image satisfies a plurality of constraints thereby generating a conditioned image; and providing the conditioned image.

7. A server system, comprising:

one or more processors; and one or more memories including instructions executable by the one or more processors to cause the one or more processors to:

receive, from a user device, a plurality of initial images and a plurality of textual descriptions specifying desired content for a target image;

encode the plurality of textual descriptions to generate an embedding vector representing the plurality of textual descriptions in a latent space;

receive noisy image data by:

encoding the plurality of initial images to the latent space; and adding a random noise to the plurality of encoded initial images;

input the embedding vector and the noisy image data to an artificial intelligence (AI) model; and generate, by using the AI model, a denoisy image corresponding to the target image based on the embedding vector, wherein the AI model outputs the target image by executing a denoising process that includes selecting image features in the noisy image data that correspond to semantic features in the embedding vector by identifying, based on the embedding vector, a plurality of sub-portions for each of the plurality of initial images as representing substantive image data, removing noise from the selected image features to create denoised image features, and combining the denoised image features into the target image by stitching the plurality of sub-portions having denoised image features together to form the target image.

8. The server system of claim 7, further comprising training the AI model based on a plurality of training images and a plurality of training textual descriptions, wherein the plurality of training images are different from the plurality of initial images, wherein the plurality of training textual descriptions are different from the plurality of textual descriptions, and wherein said training the AI model includes determining a similarity between each of the plurality of textual descriptions and a respective one of the plurality of initial images.

9. The server system of claim 8, wherein the instructions further cause the one or more processors to determine a similarity between portions of the embedding vector.

10. The server system of claim 7, wherein the instructions further cause the one or more processors to:

access a user account to identify a characteristic of a user and a profile of the user, wherein the profile of the user includes an age of the user and the characteristic includes a geographic location of the user, a plurality of game titles played by the user via the user account, a comment made by the user, and a preference of the user, and wherein the profile is stored within the user account; and generate the denoisy image corresponding to the target image based on the characteristic and the profile.

11. The server system of claim 7, wherein the instructions further cause the one or more processors to receive a geographic location within a predetermined time period from receiving the textual description.

12. The server system of claim 7, wherein the instructions further cause the one or more processors to:

condition the denoisy image corresponding to the target image by upscaling the target image to confirm that the target image satisfies a plurality of constraints thereby generating a conditioned image; and provide the conditioned image.

13. A non-transitory computer-readable medium containing program instructions, wherein execution of the program instructions by one or more processors of a computer system causes the one or more processors to carry out operations of:

receiving, from a user device, a plurality of initial images and a plurality of textual descriptions specifying desired content for a target image;

encoding the plurality of textual descriptions to generate an embedding vector representing the plurality of textual descriptions in a latent space;

receiving noisy image data by:

encoding the plurality of initial images to the latent space; and adding a random noise to the plurality of encoded initial images;

inputting the embedding vector and the noisy image data to an artificial intelligence (AI) model; and generating, by using the AI model, a denoisy image corresponding to the target image based on the embedding vector, wherein the AI model outputs the target image by executing a denoising process that includes selecting image features in the noisy image data that correspond to semantic features in the embedding vector by identifying, based on the embedding vector, a plurality of sub-portions for each of the plurality of initial images as representing substantive image data, removing noise from the selected image features to create denoised image features, and combining the denoised image features into the target image by stitching the plurality of sub-portions having denoised image features together to form the target image.

14. The non-transitory computer-readable medium of claim 13, wherein the operations further comprise training the AI model based on a plurality of training images and a plurality of training textual descriptions, wherein the plurality of training images are different from the plurality of initial images, wherein the plurality of training textual descriptions are different from the plurality of textual descriptions, and wherein said training the AI model includes determining a similarity between each of the plurality of textual descriptions and a respective one of the plurality of initial images.

15. The non-transitory computer-readable medium of claim 14, wherein generating, by using the AI model, the denoisy image includes determining a similarity between portions of the embedding vector.

16. The non-transitory computer-readable medium of claim 13, wherein the operations further comprise:

accessing a user account to identify a characteristic of a user and a profile of the user, wherein the profile of the user includes an age of the user and the characteristic includes a geographic location of the user, a plurality of game titles played by the user via the user account, a comment made by the user, and a preference of the user, wherein the profile is stored within the user account; and generating the denoisy image corresponding to the target image based on the characteristic and the profile.

17. The non-transitory computer-readable medium of claim 13, further comprising receiving a geographic location within a predetermined time period from receiving the plurality of textual descriptions.

* * * * *